(12) United States Patent  (10) Patent No.: US 7,668,533 B2
Hagiwara  (45) Date of Patent: Feb. 23, 2010

(54) CONNECTION AUTHENTICATION IN WIRELESS COMMUNICATION NETWORK SYSTEM

(75) Inventor: Toyotaka Hagiwara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 10/548,862

(22) PCT Filed: Mar. 10, 2004

(86) PCT No.: PCT/JP2004/003141
§ 371 (c)(1),
(2), (4) Date: Sep. 8, 2005

(87) PCT Pub. No.: WO2004/082206
PCT Pub. Date: Sep. 23, 2004

(65) Prior Publication Data
US 2006/0148402 A1  Jul. 6, 2006

(30) Foreign Application Priority Data
Mar. 11, 2003 (JP) ............................. 2003-064707
Oct. 14, 2003 (JP) ............................. 2003-353625

(51) Int. Cl.
*H04B 5/00*  (2006.01)
(52) U.S. Cl. ....................... 455/411; 370/252
(58) Field of Classification Search .................. 455/410, 455/411, 41.1; 711/114; 370/252
See application file for complete search history.

(56) References Cited

U.S. PATENT DOCUMENTS 6,253,320 B1 * 6/2001 Sekiguchi et al. .............. 713/2

FOREIGN PATENT DOCUMENTS

CN  1208296  2/1999

(Continued)

OTHER PUBLICATIONS

"Specification of the Bluetooth System: Core," Specification vol. 1, v1.0 B, Dec. 1999, pp. 187-199 (sections 3.1-3.5) (XP002219084).

(Continued)

*Primary Examiner*—Sam Bhattacharya
(74) *Attorney, Agent, or Firm*—Martine Penilla & Gencarella, LLP

(57) ABSTRACT

In a wireless communication network system of the invention, in response to a request for connection authentication sent from each of multiple wireless communication terminals to a base station to establish a communication link, a link management module receives authentication information of each wireless communication terminal, which is generated corresponding to a piece of identification information allocated by an identification information management module and registered in the wireless communication terminal, from the wireless communication terminal via a wireless network. The link management module compares the authentication information received from the wireless communication terminal with multiple possible options of authentication information generated corresponding to multiple different pieces of identification information allocated by the identification information management module, and authenticates the wireless communication terminal that has sent the authentication information matching with one of the multiple possible options of authentication information. The identification information management module manages a mapping of each specific piece of identification information, which corresponds to a specific option of authentication information matching with the authentication information of the authenticated wireless communication terminal, to the authenticated wireless communication terminal.

This arrangement of the invention assures simple, convenient, and safe authentication of multiple wireless communication terminals, while unequivocally identifying a process utilized by each user and the user's wireless communication terminal.

16 Claims, 20 Drawing Sheets

FOREIGN PATENT DOCUMENTS

| EP | 1 182 825 | 2/2002 |
|---|---|---|
| JP | 11-008618 | 1/1999 |
| JP | 2000-341292 | 12/2000 |
| JP | 2001-197150 | 7/2001 |
| JP | 2001-223692 | 8/2001 |
| JP | 2001-285956 | 10/2001 |
| JP | 2003-023433 | 1/2003 |

OTHER PUBLICATIONS

Abstract of Japanese Patent Publication No. 11-008618, Pub. Date: Jan. 12, 1999, Patent Abstracts of Japan.
Abstract of Japanese Patent Publication No. 2000-341292, Pub. Date: Dec. 8, 2000, Patent Abstracts of Japan.
K. Miyatsu, "Technology Kaitai Shinsho, Bluetooth Gijutsu Kaisetsu Guide," Kabushiki Kaisha Ric Telecom, Jun. 11, 2001, 1st ed., pp. 192-204.
Abstract of Japanese Patent Publication No. 2001-197150, Pub. Date: Jul. 19, 2001, Patent Abstracts of Japan.
Abstract of Japanese Patent Publication No. 2001-223692, Pub. Date: Aug. 17, 2001, Patent Abstracts of Japan.
Abstract of Japanese Patent Publication No. 2001-285956, Pub. Date: Oct. 12, 2001, Patent Abstracts of Japan.
Abstract of Japanese Patent Publication No. 2003-023433, Pub. Date: Jan. 24, 2003, Patent Abstracts of Japan.

* cited by examiner

CONNECTION AUTHENTICATION IN WIRELESS COMMUNICATION NETWORK SYSTEM

TECHNICAL FIELD

The present invention relates to a technique of connection authentication performed to establish wireless communication between a wireless communication terminal having control functions of a base station (hereafter may be referred to as 'access point') and wireless communication terminals under control of the base station (hereafter may simply be referred to as 'terminals') in a wireless communication network system that utilizes a wireless communication standard, such as Bluetooth, for data transfer.

BACKGROUND ART

Various electronic devices (wireless communication terminals) with Bluetooth (abbreviated as BT) wireless communication functions have been developed. Multiple electronic devices with these functions (hereafter referred to as 'BT terminals') are interconnected to form a network. For example, one BT terminal as a master (hereafter may be referred to as 'BT access point' or simply as 'access point') is connectable with the maximum of seven BT terminals as slaves (hereafter may be referred to simply as 'terminals') to constitute a network called Piconet. The master controls one or multiple slaves connected thereto and establishes communication with the slaves. Data packets and control packets are transmittable only between the master and the respective slaves, while direct communication between the slaves is not allowed.

In such wireless communication network systems, mutual connection authentication between the master and the respective slaves is generally required prior to actual data transmission.

Connection authentication-related techniques have been proposed, for example, in Japanese Patent Laid-Open Gazettes No. 2001-197150, No. 2001-285956, and No. 2001-223692.

There is a print service system in a public place, for example, in a family restaurant, that prints images based on image files stored in each user's digital camera (BT terminal) via a service providing server (BT access point). Each user utilizes a print service process individually provided by the service providing server to receive a desired print service through the display on a monitor located at each table in the restaurant.

Each user naturally demands to refer to image files stored in the user's own digital camera, select desired image files for printing, and give a printing instruction of the selected image files. For example, a user U1 utilizes a process PS1 to select desired image files for printing among image files stored in the user's own digital camera CM1 and give a printing instruction of the selected image files. In the case where the image files stored in the digital camera CM1 are acceptable by another process utilized by another user U2 as well as by the process PS1, the user U2 can illegally check and print the image files belonging to the user U1. In the print service system where multiple digital cameras (BT terminals) are connectable to the service providing server (BT access point), it is essential to allow only one digital camera CM1 owned by one user U1 to make connection and communication with the process PS1 utilized by the user U1, while allowing only another digital camera CM2 owned by another user U2 to make connection and communication with the process PS2 utilized by the user U2.

The BT terminal has a 48-bit identifier called BT address. This BT address is an identifier inherent to each device. Notification of the BT address given to the user's digital camera to the process utilized by the user enables the service providing server to unequivocally identify the mapping of the digital camera to the process. Such notification also ensures transfer of the information on the digital camera to the identified process. Connection authentication is performed with entries of a common PIN code (Personal Identification Number) between the BT terminal and the process utilized by the user. The successful connection authentication proves normal communication between the service providing server as the access point and the digital camera as the BT terminal.

The service providing server located in a public place naturally does not have the information on the mapping of the general users to the BT addresses given to the respective BT terminals owned by the individual users. Each user of the service providing server is thus required to notify the assigned process of the BT address of the own BT terminal. There are two available methods for such notification: (1) direct entry of the BT address; and (2) selection from a list of BT terminals connectable to the BT access point. The method (1) requires the user to accurately enter the 48-bit BT address. The method (2) requires the user to accurately select the own BT terminal based on the 48-bit BT address. The user's wrong entry or selection causes the user to fail in receiving the desired service. The user's wrong entry or selection may also cause the user to make access to another person's BT terminal. This is undesirable from the viewpoint of privacy protection.

The service system located in a public place to provide various services accordingly demands a technique of simple, convenient, and safe authentication of a normal communication link between the BT access point and each BT terminal without requiring the user's entry or selection of the BT address given to the BT terminal. Another demanded technique unequivocally identifies the mapping of the process utilized by each user to the user's own BT terminal.

The problems described above are not restricted to the wireless communication network systems where multiple BT terminals are connected to one BT access point, but are commonly found in any wireless communication network systems that utilize diversity of wireless communication standards, as well as the BT standard, for data transfer.

The technique of the invention thus aims to eliminate the drawbacks of the prior art techniques discussed above and is applied to a wireless communication network system including an access point of wireless communication (base station) connected to multiple wireless communication terminals to assure simple, convenient, and safe authentication of the multiple wireless communication terminals and to unequivocally identify the mapping of the process utilized by each user to the user's BT terminal.

DISCLOSURE OF THE INVENTION

In order to attain at least part of the above and the other related objects, the present invention is directed to a wireless communication network system including a base station and multiple wireless communication terminals connecting with the base station via a wireless network. The base station includes: an identification information management module that allocates multiple different pieces of identification information to be registered respectively in the multiple wireless communication terminals; and a link management module that manages a communication link between the base station and each of the multiple wireless communication terminals.

In response to a request for connection authentication sent from each of the multiple wireless communication terminals to the base station to establish a communication link, the link management module receives authentication information of each wireless communication terminal, which is generated corresponding to a piece of identification information allocated by the identification information management module and registered in the wireless communication terminal, from the wireless communication terminal via the wireless network. The link management module compares the authentication information received from the wireless communication terminal with multiple possible options of authentication information generated corresponding to the multiple different pieces of identification information allocated by the identification information management module, and authenticates the wireless communication terminal that has sent the authentication information matching with one of the multiple possible options of authentication information. The identification information management module manages a mapping of each specific piece of identification information, which corresponds to a specific option of authentication information matching with the authentication information of the authenticated wireless communication terminal, to the authenticated wireless communication terminal.

This arrangement of the wireless communication network system ensures simple, convenient, and safe authentication of each of the multiple wireless communication terminals, which has sent a request for connection authentication to establish connection with the base station, based on each piece of identification information allocated by the identification information management module and registered in the wireless communication terminal. This arrangement also enables identification of each piece of identification information registered in each authenticated wireless communication terminal.

In one preferable embodiment of the wireless communication network system having the above configuration, the base station further includes a process providing module that respectively provides the multiple wireless communication terminals with corresponding multiple processes. The identification information management module respectively notifies the multiple wireless communication terminals of the multiple different pieces of identification information via the corresponding processes and manages a mapping of the respective processes to the notified pieces of identification information, prior to the request for connection authentication sent from each of the multiple wireless communication terminals to the base station.

This arrangement effectively identifies the relation between each process and each authenticated wireless communication terminal and thereby enables establishment of wireless communication with the authenticated wireless communication terminal according to the identified process.

A wireless communication standard adopted in the wireless network may be Bluetooth.

The present invention is also directed to another wireless communication network system including a base station and multiple wireless communication terminals connecting with the base station via a wireless network. The base station includes: a process providing device that includes a process provider module for providing multiple processes and a first wireless control module; and a wireless communication device that includes a wireless communication module and a second wireless control module, and is connected to the process providing device via a preset line and makes wireless communication with each of the multiple wireless communication terminals by the wireless communication module.

The first wireless control module has an identification information allocation management module that allocates multiple different pieces of first identification information to the multiple processes and manages a mapping of the multiple processes to the allocated multiple different pieces of first identification information. The second wireless control module has: an identification information management module that registers and stores the multiple different pieces of first identification information allocated by the identification information allocation management module; and a link management module that manages a communication link with each of the multiple wireless communication terminals.

In response to a request for connection authentication sent from each of the multiple wireless communication terminals to the base station to establish wireless communication, each of the multiple wireless communication terminals generates second authentication information corresponding to each registered piece of second identification information and sends the generated second authentication information to the base station via the wireless network. The link management module receives the second authentication information, generates multiple possible options of first authentication information corresponding to the multiple different pieces of first identification information stored in the identification information management module, compares the received second authentication information with the generated multiple possible options of first authentication information, and authenticates the wireless communication terminal that has sent the second authentication information matching with one of the multiple possible options of first authentication information.

This arrangement also ensures simple, convenient, and safe authentication of each of the multiple wireless communication terminals, which has sent a request for connection authentication to establish connection with the base station.

In one preferable embodiment of the wireless communication network system having the above configuration, the identification information management module manages a mapping of each specific piece of first identification information, which corresponds to a specific option of first authentication information matching with the second authentication information of the authenticated wireless communication terminal, to the authenticated wireless communication terminal.

This arrangement effectively identifies the piece of second identification information registered in each authenticated wireless communication terminal.

In another preferable embodiment of the wireless communication network system having the above configuration, in response to a first control command defined in a logic interface mounted on the preset line, the first wireless control module notifies the second wireless control module via the logic interface of the multiple different pieces of first identification information to be registered in the identification information management module.

This arrangement enables each piece of first identification information allocated to each process by the identification information allocation management module of the first wireless control module to be readily registered in the identification information management module of the second wireless control module.

In one preferable structure of the above embodiment, on registration of the multiple different pieces of first identification information in the identification information management module, the second wireless control module notifies the first wireless control module via the logic interface of multiple different pieces of specific information, which respectively correspond to the registered multiple different pieces of first identification information. The identification information allocation management module manages a mapping of the multiple different pieces of first identification information to the corresponding multiple different pieces of specific information. On authentication of each wireless communication terminal by the link management module, the second wireless control module notifies the first wireless control module via the logic interface of a particular piece of specific information, which is mapped to a particular piece of first identification information corresponding to a particular possible option of first authentication information matching with the second authentication information. The identification information allocation management module identifies a process corresponding to the particular piece of first identification information mapped to the notified particular piece of specific information.

In another preferable structure of the above embodiment, in response to a second control command defined in the logic interface, the second wireless control module notifies the first wireless control module via the logic interface of a particular piece of first identification information, which corresponds to a particular possible option of first authentication information matching with the second authentication information. The identification information allocation management module identifies a process corresponding to the notified particular piece of first identification information.

Either of these structures effectively identifies each authenticated wireless communication terminal and a corresponding process.

A wireless communication standard adopted in the wireless network may be Bluetooth, and the logic interface may be a host control interface.

The technique of the invention is actualized by diversity of other applications, for example, a wireless communication network, a base station for the network, an authentication method for establishing a communication link between a base station and each of multiple wireless communication terminals connecting therewith, and a computer program product of causing a computer installed in a base station to establish a communication link with each of multiple wireless communication terminals via a wireless network.

BEST MODES OF CARRYING OUT THE INVENTION

Figure 1:
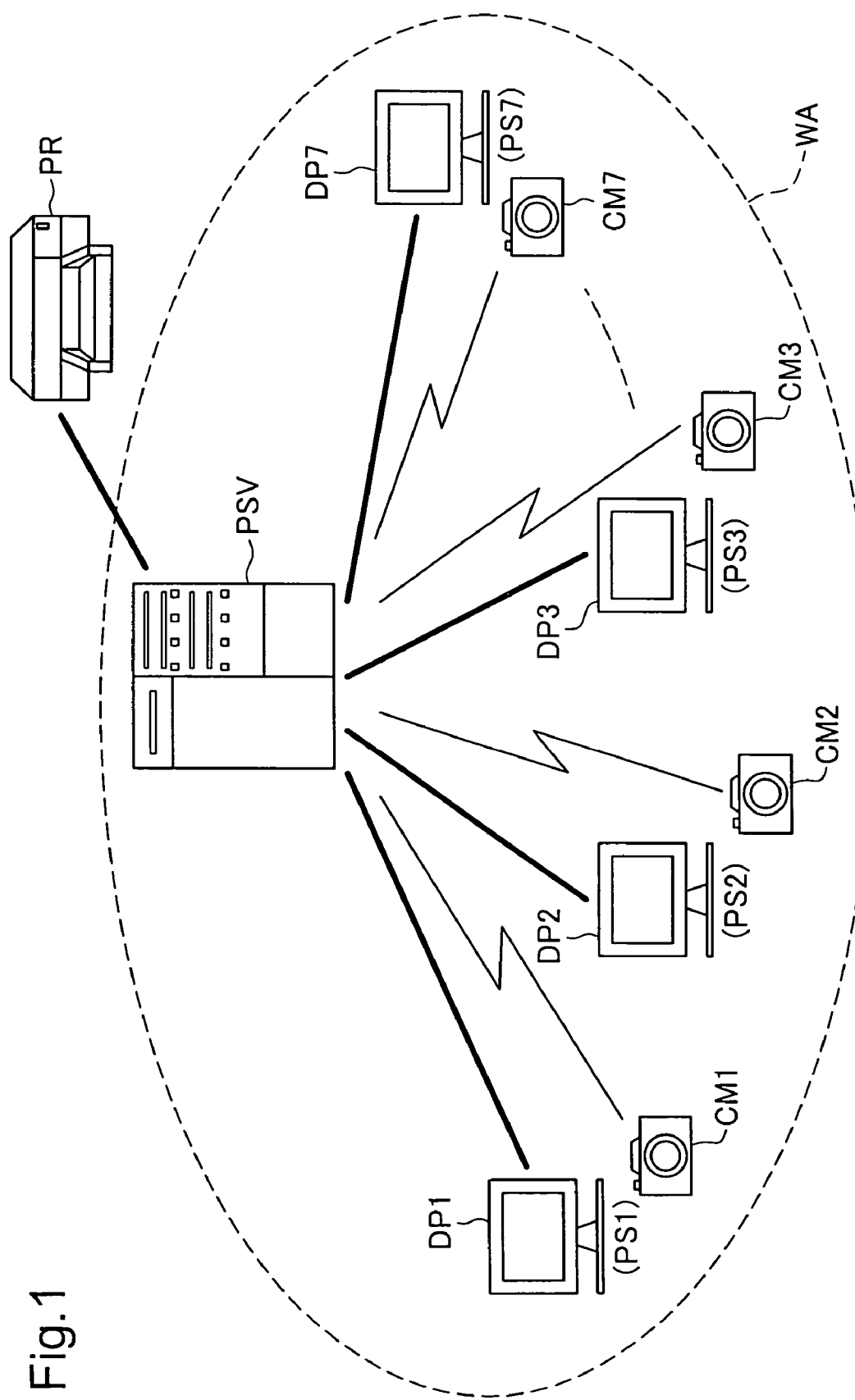
FIG. 1 schematically illustrates a print service providing system as one communication network system according to the technique of the invention.

Some modes of carrying out the invention are discussed below as preferred embodiments in the following sequence:
A. First Embodiment
  A.1. Configuration of Print Service Providing System
  A.2. Connection Authentication
    A.2.1. Principle of Connection Authentication
    A.2.2. Problems
    A.2.3. Connection Authentication of Embodiment
  A.3. Effects
B. Second Embodiment
  B.1. Configuration of Print Service Providing System
  B.2. Connection Authentication at Establishment of Links
    B.2.1. Problems
    B.2.2. Connection Authentication of Embodiment
  B.3. Connection Authentication after Establishment of Links
    B.3.1. Problems
    B.3.2. Connection Authentication of Embodiment
  B.4. Effects
C. Modifications A. First Embodiment A.1. Configuration of Print Service Providing System FIG. 1 schematically illustrates a print service providing system as one communication network system according to the technique of the invention. The print service providing system includes a server PSV to provide print services and a printer PR connected to the server PSV.

The server PSV has BT communication functions and works as a BT access point (base station). According to the BT standard, seven BT terminals (wireless communication terminals) at the maximum are connectable to the server PSV.

Seven monitors DP1 to DP7 are accordingly linked to the server PSV to enable the maximum of seven users to simultaneously receive the print services.

The server PSV provides the respective users with processes PS1 to PS7 of the print services through the displays on the monitors DP1 to DP7. The processes PS1 to PS7 represent functional blocks to control interfaces with the respective users and various services provided by the server to the respective users, for example, the print services in this embodiment. Each user utilizes the process of the print service provided through the display on the monitor to receive the print service and print images stored in the user's own BT terminal with the printer PR.

In the print service providing system of FIG. 1, seven digital cameras CM1 to CM7 as the maximum number of BT terminals (slaves) connectable with the server PSV are located in a communication range (coverage) WA of the server PSV as the BT access point (master).

Figure 2:
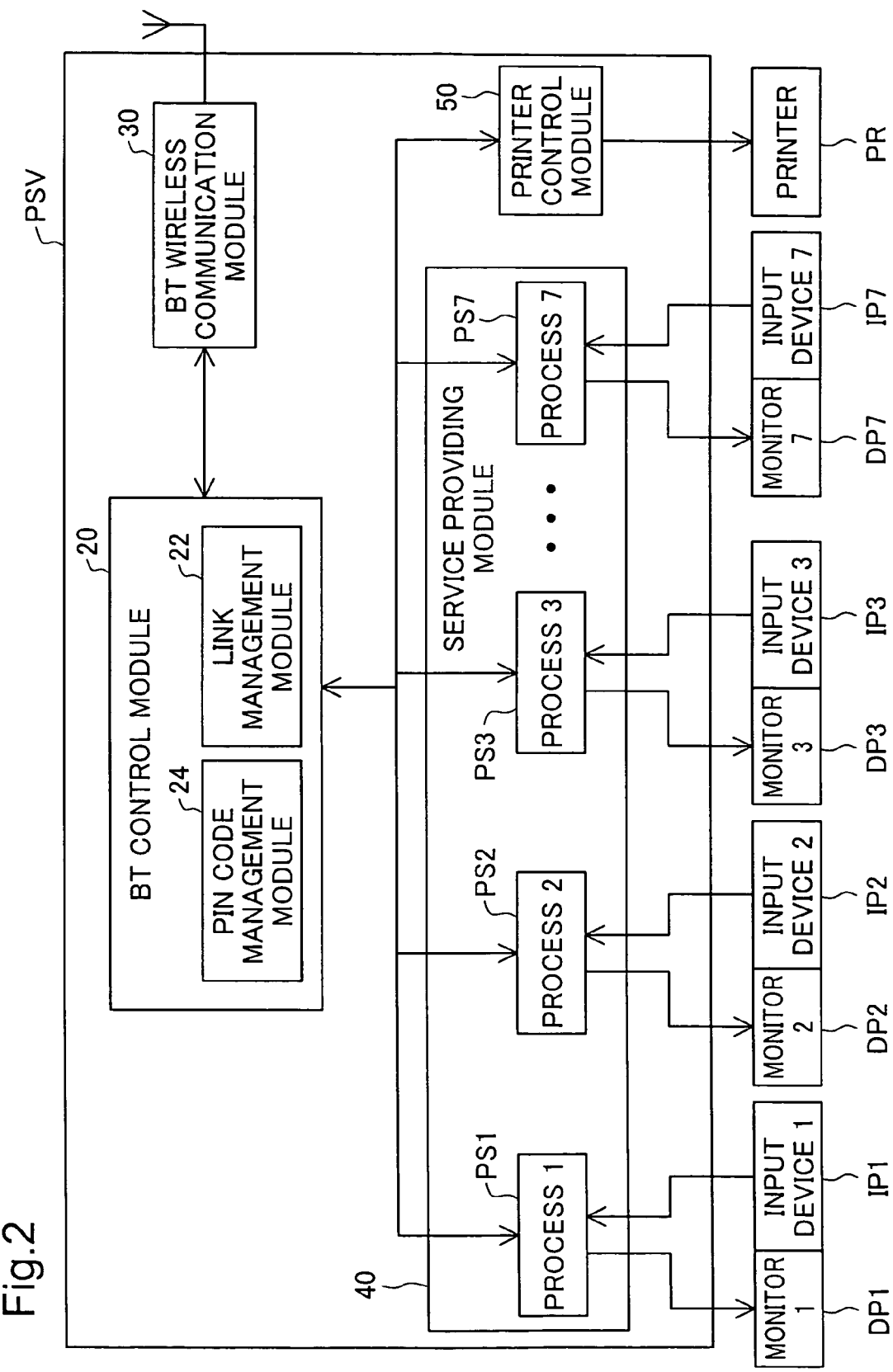
FIG. 2 is a functional block diagram schematically illustrating the configuration of a sever PSV.

FIG. 2 is a functional block diagram schematically illustrating the configuration of the sever PSV. The server PSV has a BT control module 20, a BT wireless communication module 30, a service providing module 40, and a printer control module 50. The server PSV naturally includes internal storage devices and various control modules, as well as diversity of peripheral devices, for example, external storage devices and wired communication devices, and interfaces, for example, display interfaces and input interfaces, generally included in the computer. These components are, however, not directly related to the characteristics of the invention and are thus neither illustrated nor explained here.

The BT control module 20 controls wireless communication made by the BT wireless communication module 30. The BT control module 20 includes a link management module 22 that manages required connection authentication for establishment of communication links with the respective digital cameras CM1 to CM7 and a PIN code management module (identification information management module) 24 that allocates different PIN codes (different pieces of identification information) to be individually registered in the respective digital cameras CM1 to CM7. The respective processes PS1 to PS7 in the service providing module 40 inform the individual users of the allocated PIN codes through the display on the monitors DP1 to DP7. The operations of the link management module 22 will be discussed later in detail.

The service providing module 40 carries out the $1^{st}$ to the $7^{th}$ processes PS1 to PS7 to control the print services simultaneously provided to seven users U1 to U7. The $1^{st}$ to the $7^{th}$ processes PS1 to PS7 display a guidance window for providing the print services on the corresponding $1^{st}$ to the $7^{th}$ monitors DP1 to DP7. The print service providing system also includes $1^{st}$ to $7^{th}$ input devices IP1 to IP7, for example, touch panels or tablets, corresponding to the $1^{st}$ to the $7^{th}$ monitors DP1 to DP7, although these input devices IP1 to IP7 are omitted from the illustration of FIG. 1. In response to entry and selection by each of the users U1 to U7 in the guidance window displayed on the corresponding one of the monitors DP1 to DP7, the corresponding one of the processes PS1 to PS7 makes the required print service.

The printer control module 50 controls the operations of the printer PR in response to commands from each of the processes PS1 to PS7 in the service providing module 40, so as to implement printing.

Figure 3:
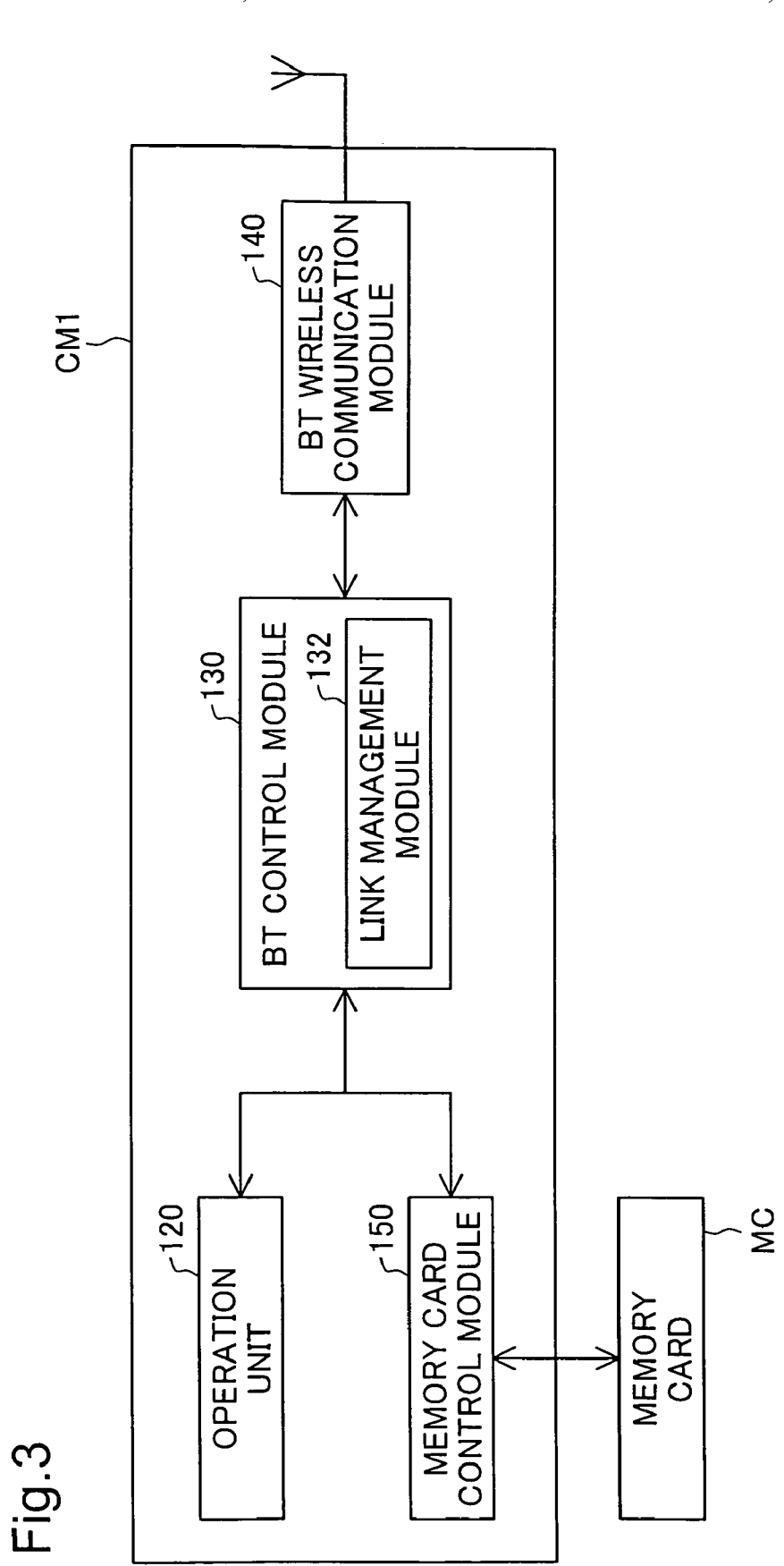
FIG. 3 is a functional block diagram schematically illustrating the configuration of a digital camera CM1.

FIG. 3 is a functional block diagram schematically illustrating the configuration of the digital camera CM1. The functional block diagram of FIG. 3 shows only the configuration required for wireless communication with the server PSV in the print service providing system of FIG. 1. Imaging function-related components and other essential components of the camera are omitted from the illustration of FIG. 3.

The digital camera CM1 includes an operation unit 120, a BT control module 130, a BT wireless communication module 140, and a memory card control module 150. A memory card MC is attachable to and detachable from the digital camera CM1.

The operation unit 120 includes input means, such as switches and a touch panel, for operations of the digital camera and display means.

The BT control module 130 controls wireless communication made by the BT wireless communication module 140. The BT control module 130 includes a link management module 132 that manages required connection authentication for establishment of a communication link with the server PSV. The operations of the link management module 132 will be discussed later in detail.

The memory card control module 150 controls writing and reading of image data and other diverse data into and from the memory card MC. The image data stored in the memory card MC may be transferred to the server PSV via the BT control module 130.

The other digital cameras CM2 to CM7 have the same configuration as that of the digital camera CM1 shown in FIG. 3 to establish wireless communication with the server PSV in the print service providing system of FIG. 1.

In the print service providing system of the above configuration, when a user gives a start command of the print service in the window displayed on the monitor, image data stored in the memory card of the user's digital camera are transferred to a storage device (not shown) in the server PSV and are displayed as a list of thumbnails or file names on the monitor. When the user selects desired image data to be printed in the list of image data and gives a print command, the selected image data are transferred from the server PSV to the printer PR (see FIG. 1) to be printed. Each user receives the independent print service according to the process provided through the display on the monitor. Namely this print service providing system enables each user to utilize the process provided through the display on the monitor and receive the individual print service.

A.2. Connection Authentication

In the print service providing system, establishment of the BT wireless communication between the server PSV as the BT access point (master) and each of the digital cameras CM1 to CM7 as the BT terminal (slave) requires Piconet synchronization between the master and each slave via a synchronization establishing phase according to the BT communication standard and a subsequent shift to a communication connection phase for packet communication.

The communication connection phase has two processing statuses, that is, a connection status and a data transfer status. In the connection status, control packets for establishing communication links and control packets relating to securities are sent and received, while actual data packets are not transmitted. In the data transfer status, on the other hand, actual data packets are sent and received.

The BT communication standard uses radio waves for the communication medium and accordingly does not have any physical restriction between terminals, unlike cables. The radial propagation of information transmitted by wireless requires securities to prevent improper connection between the master and the slave and illegal interception. The BT communication standard is accordingly designed to, in response to a first shift to the connection status of the communication connection phase via the synchronization establishing phase, prohibit a further shift to the data transfer status for actual data transmission unless completion of mutual connection authentication and encryption settings between the master and the slave.

The description below sequentially regards the principle of connection authentication defined in the BT communication standard, potential problems arising in the conventional connection authentication, and the procedure of connection authentication of this embodiment.

A.2.1. Principle of Connection Authentication

Figure 4:
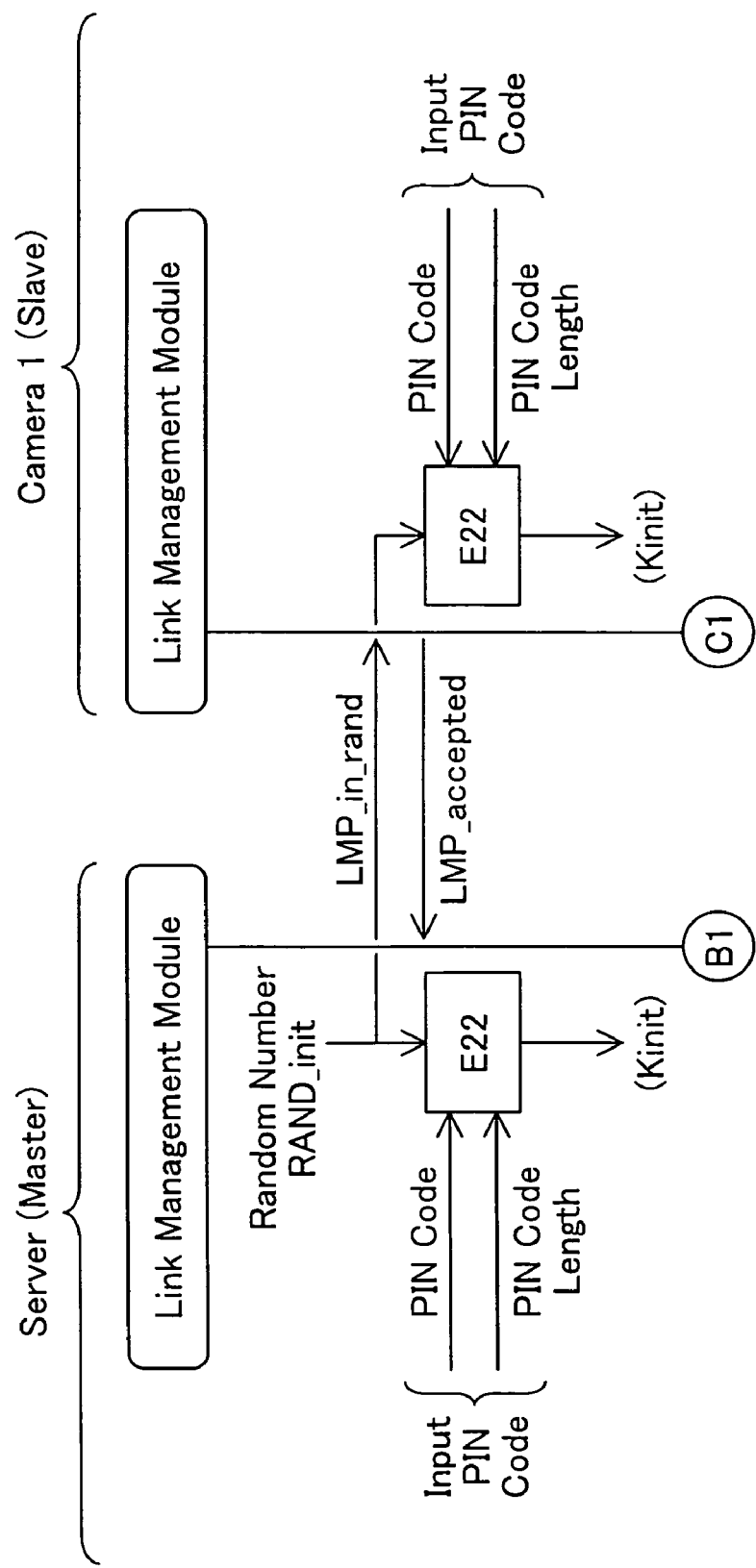
FIG. 4 shows the principle of connection authentication.
Figure 5:
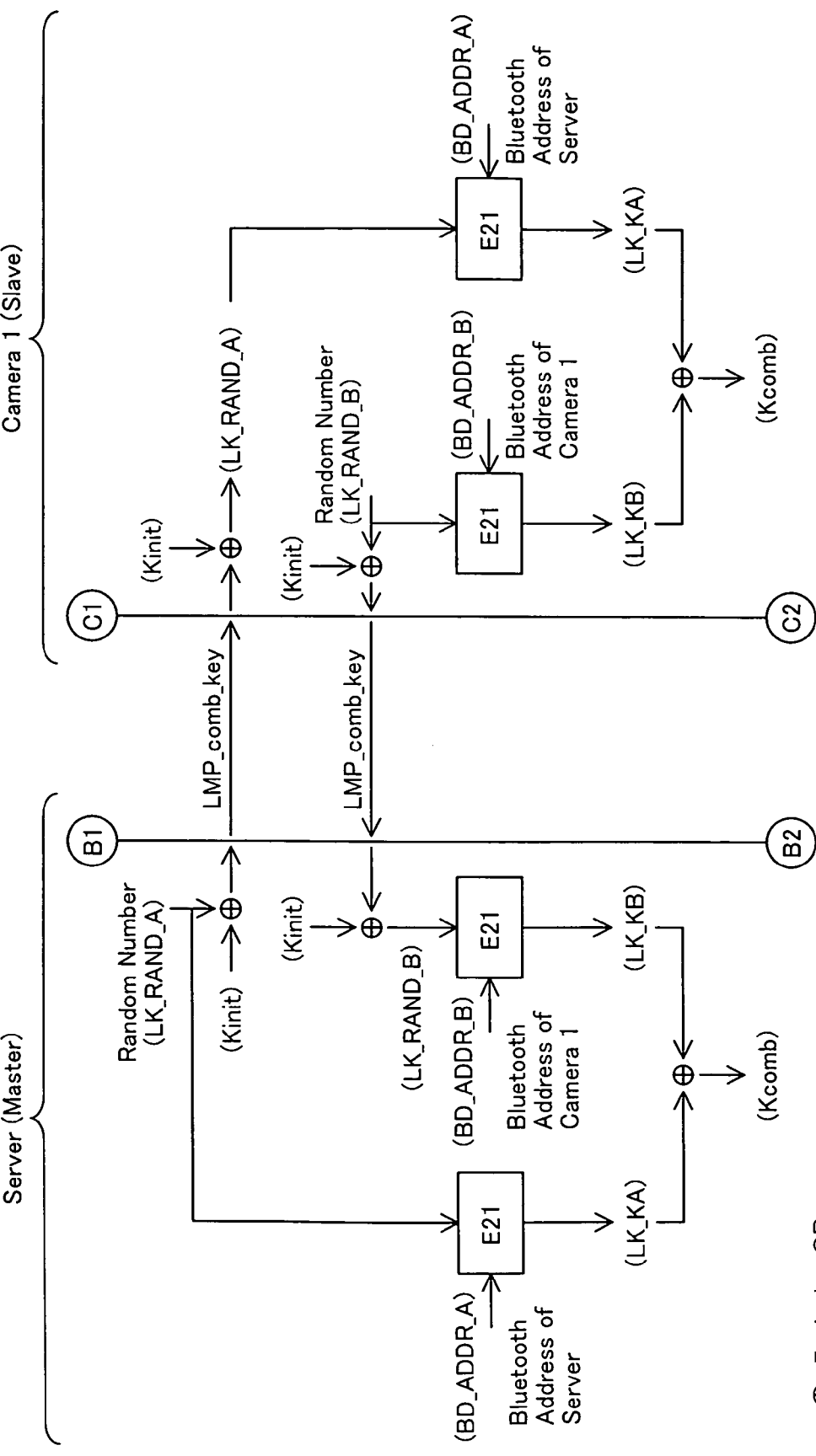
FIG. 5 shows the principle of connection authentication.
Figure 6:
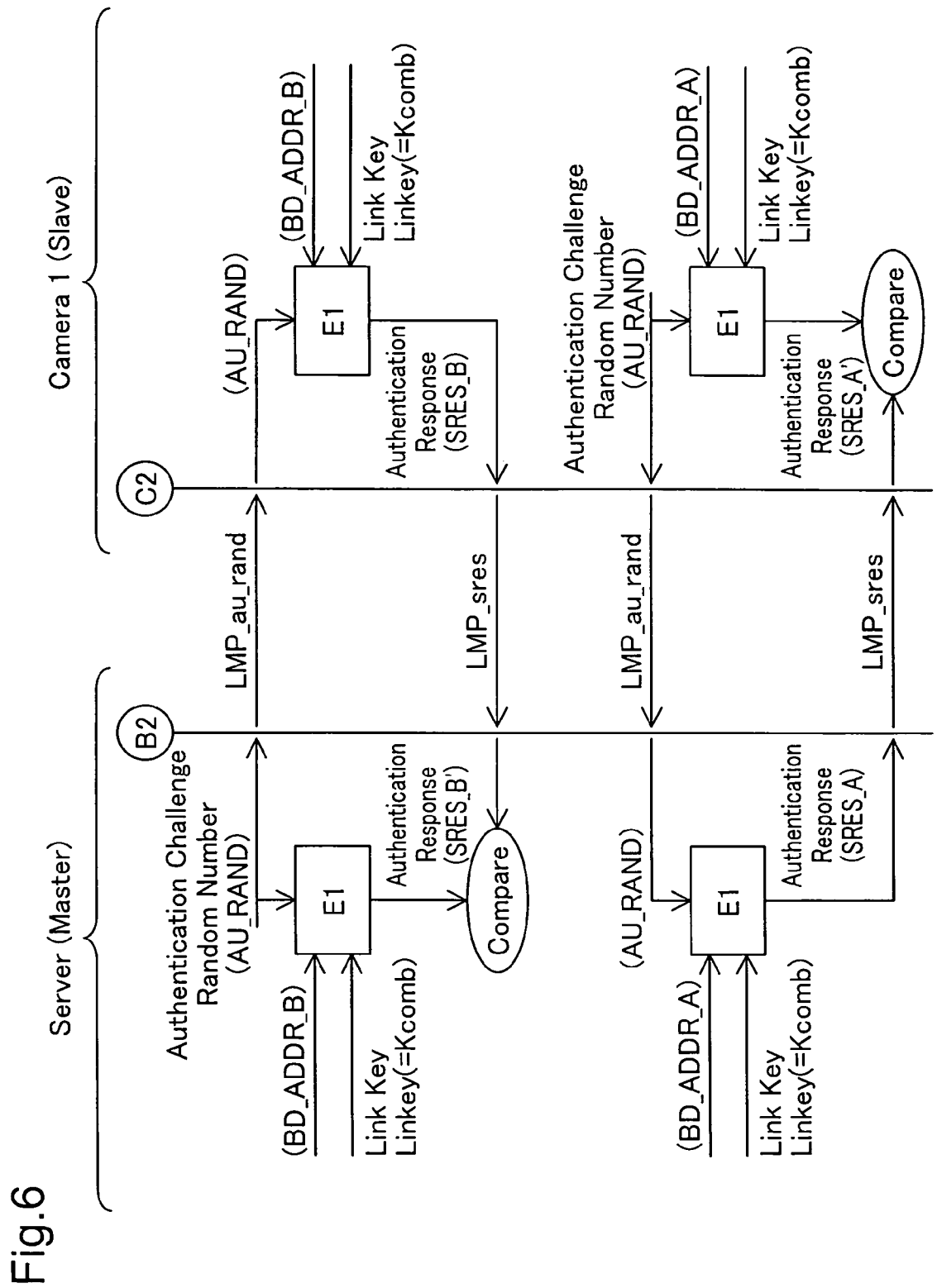
FIG. 6 shows the principle of connection authentication.

FIGS. 4 through 6 show the principle of connection authentication according to the BT communication standard, on the assumption that the server PSV provides only one process PS1 and only one digital camera CM1 possessed by one user U1 is connected to the server PSV in the print service providing system of FIG. 1. In the description below, the server PSV and the digital camera CM1 may respectively be referred to as the master and as the slave.

The BT securities are managed by 128-bit secret keys called link keys. Each link key represents a parameter for managing one-to-one security between specified two terminals, and is not open to any third terminal or entity. Communication by a communication protocol on an upper layer than the level of a link management layer is not allowed without this parameter setting between the master and the slave. Prior to actual connection authentication, the link management module 22 included in the BT control module 20 of the master (server PSV) and the link management module 132 included in the BT control module 130 of the slave (digital camera CM1) cooperatively carry out a pairing process to generate link keys between the master and the slave. Mutual connection authentication is then performed by both the master and the slave with the link keys. The detailed procedure of the standard pairing and connection authentication processes is described below.

(1) Pairing Process

In the pairing process, the master and the slave first agree on pairing as shown in FIG. 4. The master sends a control packet 'LMP_in_rand' to the slave to require generation of an initialization key as a request for pairing with the slave. At this moment, the master generates a 128-bit random number RAND_init as an initialization key generation random number used for generation of the initialization key and sends the initialization key generation random number RAND_init to the slave.

The slave sends back a control packet 'LMP_accepted' to accept the request for pairing. This reaches an agreement on pairing between the master and the slave. The slave otherwise sends back a control packet 'LMP_not_accepted' to reject the request for pairing.

The master and the slave individually generate the initialization keys, in response to the agreement on pairing.

The initialization key is computed from three input parameters, a PIN code, a PIN code length, and the initialization key generation random number RAND_mit, according to an initialization key algorithm (E22). The initialization key generation random number RAND_init has been sent from the master to the slave at the time of agreement on pairing. Input of an identical PIN code in both the link management module 22 of the master (server PSV) and the link management module 132 of the slave (digital camera CM1) leads to generation of an identical initialization key Kinit.

When the user U1 operates the input device IP1 to enter a PIN code, the process PS1 causes the PIN code and the PIN code length to be input into the link management module 22 of the master. Similarly when the user U1 operates the input unit of the operation unit 120 to enter a PIN code, the PIN code and the PIN code length are input into the link management module 132 of the slave. The PIN code entered by the user is a variable-length value of maximum 16 bytes (128 bits). When the PIN code length of the input PIN code is less than 16 bytes, adequate digits are supplemented.

The master and the slave then make a negotiation on setting of a composite key to a link key as shown in FIG. 5. The master sends a control packet 'LMP_comb_key' to the slave to request registration of a composite key as a link key. At this moment, the master generates a 128-bit random number LK_RAND_A as a $1^{st}$ composite key generation random number used for generation of a composite key and sends the composite key generation random number LK_RAND_A to the slave.

Similarly the slave sends a control packet 'LMP_comb_key' to the master. At this moment, the slave generates a 128-bit random number LK_RAND_B as a $2^{nd}$ composite key generation random number and sends the composite key generation random number LK_RAND_B to the master.

These composite key generation random numbers LK_RAND_A and LK_RAND_B are to be not open to any third terminal or entity. The master accordingly sends an exclusive OR of the initialization key Kinit and the $1^{st}$ composite key generation random number LK_RAND_A to the slave, whereas the slave sends an exclusive OR of the initialization key Kinit and the $2^{nd}$ composite key generation random number LK_RAND_B to the master. The master and the slave mutually exchange the $1^{st}$ composite key generation random number LK_RAND_A and the $2^{nd}$ composite key generation random number LK_RAND_B by computing an exclusive OR of the initialization key Kinit and the received exclusive OR.

In response to the successful negotiation between the master and the slave on setting of the composite key to the link key, the master and the slave individually generate composite keys.

The composite key is generated as an exclusive OR of a temporary single key of the master and a temporary single key of the slave. The temporary single key of the master is computed from two input parameters, a BT address BD_ADDR_A of the master and the $1^{st}$ composite key generation random number LK_RAND_A, according to a single key algorithm (E21). The temporary single key of the slave is computed from two input parameters, a BT address BD_ADDR_B of the slave and the $2^{nd}$ composite key generation random number LK_RAND_B, according to the single key algorithm (E21).

The two composite key generation random numbers LK_RAND_A and LK_RAND_B are exchanged between the master and the slave at the negotiation. The respective BT addresses BD_ADDR_A and BD_ADDR_B are exchanged between the master and the slave in the synchronization establishing phase and are known parameters to both the master and the slave. The master and the slave are thus expected to individually generate identical temporary single keys LK_KA of the master and identical temporary single keys LK_KB of the slave and thereby to individually generate identical composite keys Kcomb as an exclusive OR of these two identical temporary single keys LK_KA and LK_KB. The individually generated composite keys Kcomb are set to link keys Linkey and are registered respectively in non-illustrated memories of the master and the slave.

(2) Connection Authentication Process

Connection authentication is then performed with the link keys Linkey individually generated and set by the master and the slave as shown in FIG. 6. The slave first gives an authentication request to the master and the master then gives an authentication request to the slave for mutual connection authentication.

The master sends a control packet 'LMP_au_rand' to the slave. At this moment, the master generates a 128-bit authentication challenge random number AU_RAND and sends the authentication challenge random number AU_RAND to the slave. The master also computes an authentication response parameter SRES_B' from three input parameters, the link key Linkey (=Kcomb), the BT address BD_ADDR_B of the slave, and the authentication challenge random number AU_RAND, according to a connection authentication algorithm (E1).

The slave receives the authentication challenge random number AU_RAND in the control packet 'LMP_au_rand' and similarly computes an authentication response parameter SRES_B from three input parameters, the link key Linkey (=Kcomb), the BT address BD_ADDR_B of the slave, and the authentication challenge random number AU_RAND, according to the connection authentication algorithm (E1). The slave subsequently sends a control packet 'LMP_sres' to the master to request the master to perform connection authentication. At this moment, the slave sends the computed authentication response parameter SRES_B in the control packet 'LMP_sres' to the master.

The master receives the authentication response parameter SRES_B and compares the received authentication response parameter SRES_B with the computed authentication response parameter SRES_B' to give permission for or place a prohibition on connection with the slave. This completes authentication of the slave performed by the master.

An authentication request by the master is given in the opposite direction to the authentication request by the slave. The slave first sends a control packet 'LMP_au_rand' to the master. At this moment, the slave generates a 128-bit authentication challenge random number AU_RAND and sends the authentication challenge random number AU_RAND to the master. The slave also computes an authentication response parameter SRES_A' from three input parameters, the link key Linkey (=Kcomb), the BT address BD_ADDR_A of the master, and the authentication challenge random number AU_RAND, according to the connection authentication algorithm (E1).

The master receives the authentication challenge random number AU_RAND in the control packet 'LMP_au_rand' and similarly computes an authentication response parameter SRES_A from three input parameters, the link key Linkey (=Kcomb), the BT address BD_ADDR_A of the master, and the authentication challenge random number AU_RAND, according to the connection authentication algorithm (E1). The master subsequently sends a control packet 'LMP_sres' to the slave to request the slave to perform connection authentication. At this moment, the master sends the computed authentication response parameter SRES_A in the control packet 'LMP_sres' to the slave.

The slave receives the authentication response parameter SRES_A and compares the received authentication response parameter SRES_A with the computed authentication response parameter SRES_A' to give permission for or place a prohibition on connection with the master. This completes authentication of the master performed by the slave.

The successful authentication by both the master and the slave completes the connection authentication. Generation of different link keys by the master and the slave, that is, a difference in any of the common parameters used for generation of the link keys, leads to inconsistency of the computed authentication response parameters and resulting failure in establishment of connection. This technique ensures security between the master and the slave.

A.2.2. Problems

The principle discussed above is successfully applied to connection authentication in the case of connection of only one slave (BT terminal) to one master (BT access point). The connection authentication according to the above principle, however, has some problems in the case of simultaneous connection of the multiple digital cameras CM1 to CM7 as the slaves to the server PSV as the master to constitute one Piconet as in the print service providing system of the embodiment shown in FIG. 1.

One available technique sets a common PIN code to be used in the Piconet and gives the common PIN code to the respective users U1 to U7 through the display on the monitors DP1 to DP7. The given common PIN code is input into the own digital cameras CM1 to CM7 by the respective users U1 to U7.

Individual connection authentications between the respective digital cameras CM1 to CM7 and the server PSV according to the above principle enable establishment of the respective communication links. In this case, only the inherent BT addresses are usable as the identification parameter for discriminating the seven digital cameras CM1 to CM7. For one-to-one mapping of the seven digital cameras CM1 to CM7 to the seven processes PS1 to PS7 used by the seven users U1 to U7 with a common PIN code, the respective users U1 to U7 are required to notify the corresponding processes PS1 to PS7 of the inherent BT addresses of the own digital cameras CM1 to CM7. As described above as the drawbacks of the prior art technique, it is rather undesirable to ask such notification to the general users.

Another available technique allocates different PIN codes PIN_1 to PIN_7 to the processes PS1 to PS7 used by the respective users U1 to U7 and gives the allocated PIN codes PIN_1 to PIN_7 to the respective users U1 to U7 through the display on the monitors DP1 to DP7. The given PIN codes PIN_1 to PIN_7 are input into the own digital cameras CM1 to CM7 by the respective users U1 to U7.

The master is notified of the PIN codes PIN_1 to PIN_7 allocated to the respective processes PS1 to PS7. The PIN code is, however, not directly used for actual transmission of data packets between the master and the slaves in the synchronization establishing phase or the communication connection phase as described previously. The master or the server PSV is accordingly not informed of which of the seven different PIN codes is input in which of the seven slaves or the seven digital cameras CM1 to CM7. This leads to failed specification of an adequate link key, which is generated corresponding to one of the seven PIN codes, to be used for each of the seven digital cameras CM1 to CM7 in the process of connection authentication between the respective digital cameras CM1 to CM7 and the server PSV.

Connection authentication is, however, possible even in this case. The technique sequentially selects one of the seven PIN codes PIN_1 to PIN_7 for each of the seven digital cameras CM1 to CM7 and performs the connection authentication according to the principle discussed above. The $1^{st}$ digital camera requires up to 7 cycles of the connection authentication. The $2^{nd}$, $3^{rd}$, $4^{th}$, $5^{th}$, $6^{th}$, and $7^{th}$ digital cameras respectively require up to 6 cycles, 5 cycles, 4 cycles, 3 cycles, 2 cycles, and 1 cycle of the connection authentication. Namely the maximum of 28 cycles of the connection authentication enable the seven digital cameras CM1 to CM7 to be one-to-one mapped to the seven processes PS1 to PS7 used by the seven users U1 to U7.

This technique is, however, remarkably inefficient to require up to 28 cycles of the connection authentication for completed connection authentication with regard to all the seven digital cameras CM1 to CM7.

The embodiment accordingly adopts the following technique for connection authentication.

A.2.3. Connection Authentication of Embodiment

Figure 7:
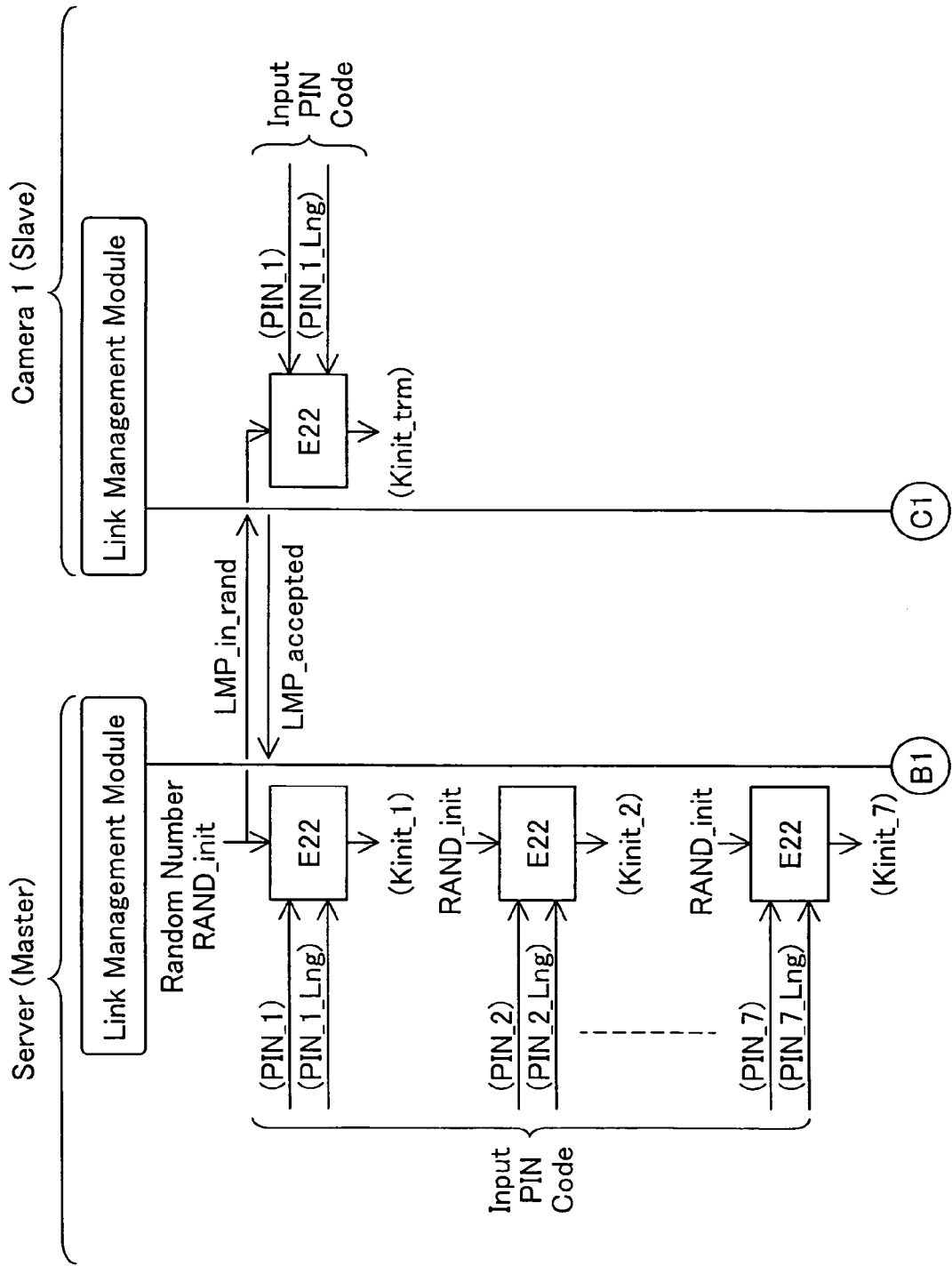
FIG. 7 shows a procedure of connection authentication executed in an embodiment.
Figure 8:
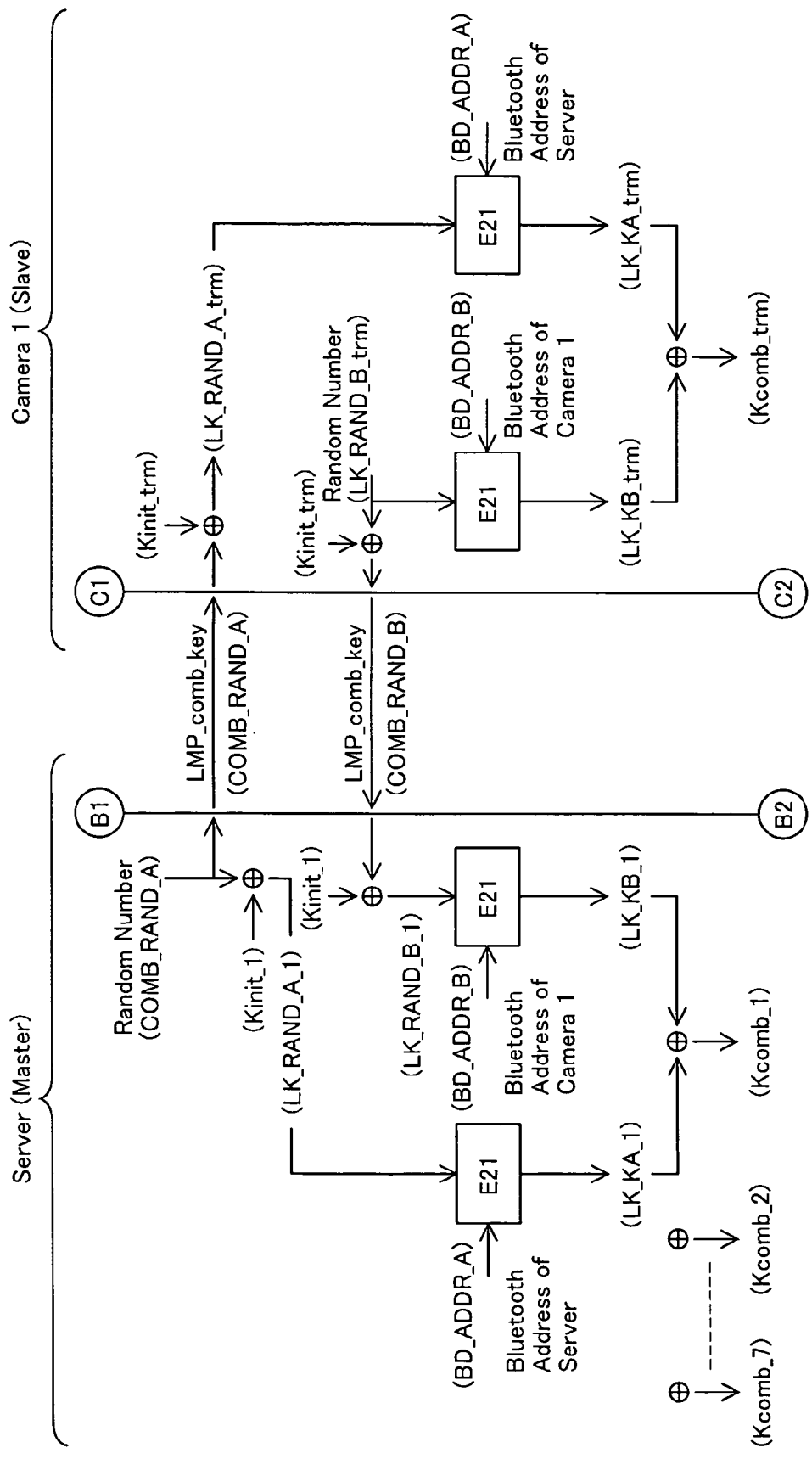
FIG. 8 shows the procedure of connection authentication executed in the embodiment.
Figure 9:
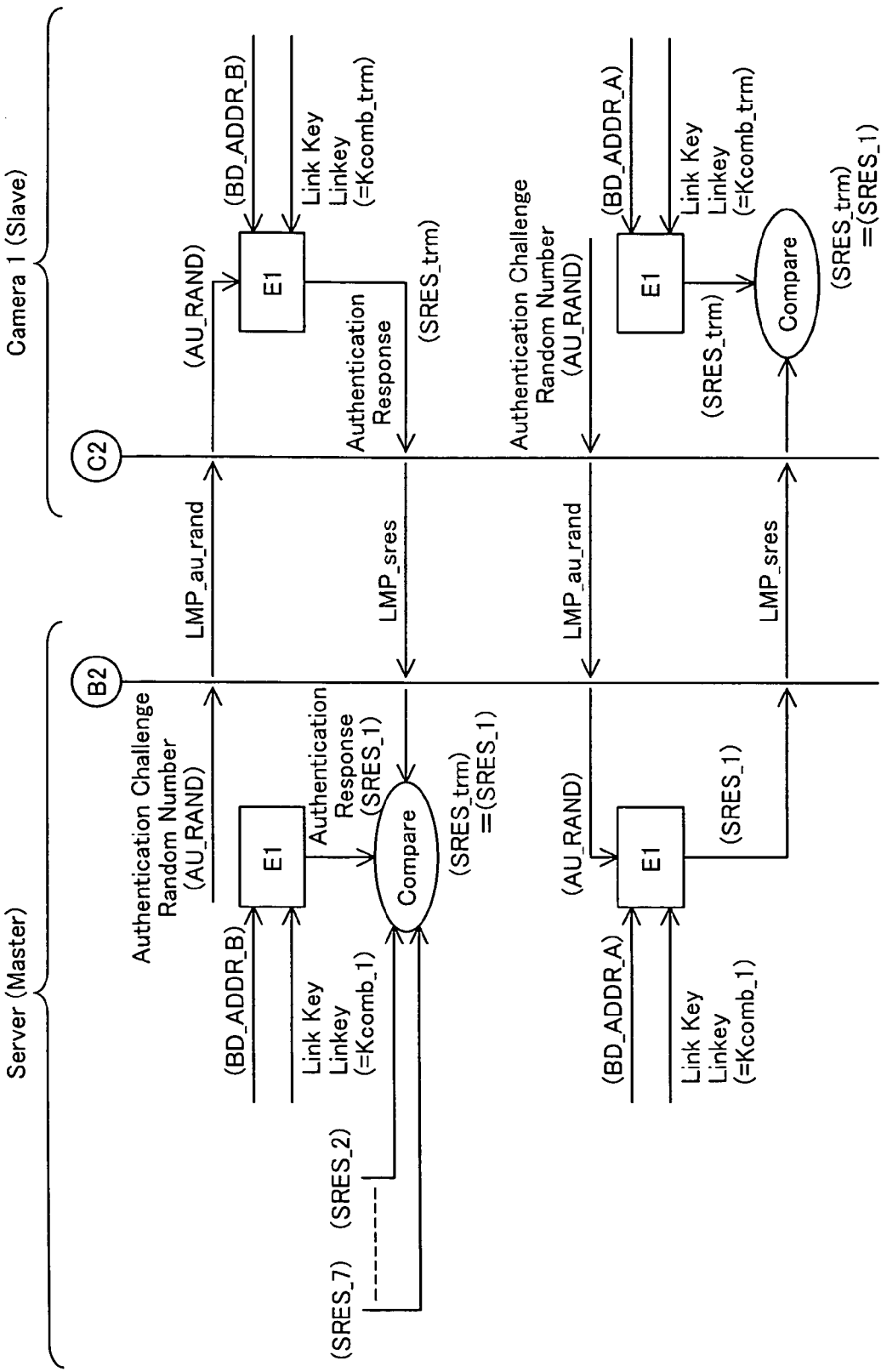
FIG. 9 shows the procedure of connection authentication executed in the embodiment.

FIGS. 7 through 9 show a procedure of connection authentication executed in this embodiment. The procedure of connection authentication shown in FIGS. 7 through 9 is on the assumption that the server PSV provides the $1^{st}$ to the $7^{th}$ processes PS1 to PS7 as shown in FIG. 1. The following description specifically regards connection authentication between the $1^{st}$ digital camera CM1 and the server PSV among connection authentications between the server PSV and the respective digital cameras CM1 to CM7 possessed by the seven users U1 to U7. In the description below, the server PSV and the $1^{st}$ digital camera CM1 may respectively be referred to as the master and as the slave.

The connection authentication procedure of this embodiment basically follows the sequence of the principle discussed above. The link management module 22 included in the BT control module 20 of the master (server PSV) and the link management module 132 included in the BT control module 130 of the slave ($1^{st}$ digital camera CM1) cooperatively carry out a pairing process to generate link keys between the master and the slave. Mutual connection authentication is then performed by both the master and the slave with the link keys. The detailed procedure of the pairing and connection authentication processes of the embodiment is described below.

(1) Pairing Process

In the pairing process, the master and the slave first agree on pairing as shown in FIG. 7. The master sends a control packet 'LMP_in_rand' to the slave to require generation of an initialization key as a request for pairing with the slave. The master generates an initialization key generation random number RAND_init and sends the initialization key generation random number RAND_init to the slave.

The slave sends back a control packet 'LMP_accepted' to accept the request for pairing. This reaches an agreement on pairing between the master and the slave. The master and the slave then individually generate the initialization keys, in response to the agreement on pairing.

In the master, PIN codes allocated to the respective processes PS1 to PS7 by the PIN code management module 24 (see FIG. 2) and respective PIN code lengths are input into the link management module 22. Initialization keys Kinit_1 to Kinit_7 respectively corresponding to the input PIN codes are computed according to the initialization key algorithm (E22) as shown by Expressions (a1) to (a7) given below. In this example, the PIN codes allocated to the respective processes PS1 to PS7 are PIN_1 to PIN_7 and have PIN code lengths PIN_1_Lng to PIN_7_Lng:

$$Kinit\_1 = E22(RAND\_init, PIN\_1, PIN\_1\_Lng) \quad (a1)$$

$$Kinit\_2 = E22(RAND\_init, PIN\_2, PIN\_2\_Lng) \quad (a2)$$

$$Kinit\_3 = E22(RAND\_init, PIN\_3, PIN\_3\_Lng) \quad (a3)$$

$$Kinit\_4 = E22(RAND\_init, PIN\_4, PIN\_4\_Lng) \quad (a4)$$

$$Kinit\_5 = E22(RAND\_init, PIN\_5, PIN\_5\_Lng) \quad (a5)$$

$$Kinit\_6 = E22(RAND\_init, PIN\_6, PIN\_6\_Lng) \quad (a6)$$

$$Kinit\_7 = E22(RAND\_init, PIN\_7, PIN\_7\_Lng) \quad (a7)$$

The user U1 of the $1^{st}$ digital camera CM1 operates the operation unit 120 (see FIG. 1) to enter the PIN code PIN_1 allocated to the $1^{st}$ process PS1 into the slave. The link management module 132 then receives the PIN code PIN_1 and its PIN code length PIN_1_Lng. An initialization key Kinit_trm is computed according to the initialization key algorithm (E22) as shown by Expression (b1) given below:

$$Kinit\_trm = E22(RAND\_init, PIN\_1, PIN\_1\_Lng) \quad (b1)$$

The master and the slave then make a negotiation on setting of a composite key to a link key as shown in FIG. 8. The master sends a control packet 'LMP_comb_key' to the slave to request registration of a composite key as a link key.

In the principle of connection authentication discussed above, the master generates the $1^{st}$ composite key generation random number LK_RAND_A, computes an exclusive OR of the initialization key Kinit and the $1^{st}$ composite key generation random number LK_RAND_A, and sends the result of the exclusive OR in the control packet 'LMP_comb_key' to the slave, as shown in FIG. 5. The embodiment, however, can not adopt the same procedure, since the master has computed seven possible options of the initialization key Kinit_1 to Kinit_7.

In the system of the embodiment, the master generates a 128-bit random number COMB_RAND_A and sends the COMB_RAND_A to the slave. Exclusive ORs (XORs) of the random number COMB_RAND_A and the respective possible options of the initialization key Kinit_1 to Kinit_7 give seven possible options of $1^{st}$ composite key generation random number LK_RAND_A_1 to LK_RAND_A_7 as shown by Expressions (c1) to (c7) given below:

$$LK\_RAND\_A\_1 = (COMB\_RAND\_A) XOR (Kinit\_1) \quad (c1)$$

$$LK\_RAND\_A\_2 = (COMB\_RAND\_A) XOR (Kinit\_2) \quad (c2)$$

$$LK\_RAND\_A\_3 = (COMB\_RAND\_A) XOR (Kinit\_3) \quad (c3)$$

$$LK\_RAND\_A\_4 = (COMB\_RAND\_A) XOR (Kinit\_4) \quad (c4)$$

$$LK\_RAND\_A\_5 = (COMB\_RAND\_A) XOR (Kinit\_5) \quad (c5)$$

$$LK\_RAND\_A\_6 = (COMB\_RAND\_A) XOR (Kinit\_6) \quad (c6)$$

$$LK\_RAND\_A\_7 = (COMB\_RAND\_A) XOR (Kinit\_7) \quad (c7)$$

Similarly the slave computes an exclusive OR (XOR) of the random number COMB_RAND_A sent from the master and the initialization key Knit_trm to give a $1^{st}$ composite key generation random number LK_RAND_A_trm as shown by Expression (d1) given below:

$$LK\_RAND\_A\_trm = (COMB\_RAND\_A) XOR (Kinit\_trm) \quad (d1)$$

In the same manner as the principle of connection authentication shown in FIG. 5, the slave generates a $2^{nd}$ composite key generation random number LK_RAND_B, computes an exclusive OR of the $2^{nd}$ composite key generation random number LK_RAND_B and the initialization key Kinit_trm, and sends the result of the exclusive OR as a random number COMB_RAND_B in the control packet 'LMP_comb_key' to the master.

The master receives the random number COMB_RAND_B and computes exclusive ORs (XORs) of the received random number COMB_RAND_B and the possible options of the initialization key Kinit_1 to Kinit_7 to give seven possible options of $2^{nd}$ composite key generation random number LK_RAND_B_1 to LK_RAND_B_7 as shown by Expressions (e1) to (e7) given below:

$$LK\_RAND\_B\_1 = (COMB\_RAND\_B)XOR(Kinit\_1) \quad (e1)$$

$$LK\_RAND\_B\_2 = (COMB\_RAND\_B)XOR(Kinit\_2) \quad (e2)$$

$$LK\_RAND\_B\_3 = (COMB\_RAND\_B)XOR(Kinit\_3) \quad (e3)$$

$$LK\_RAND\_B\_4 = (COMB\_RAND\_B)XOR(Kinit\_4) \quad (e4)$$

$$LK\_RAND\_B\_5 = (COMB\_RAND\_B)XOR(Kinit\_5) \quad (e5)$$

$$LK\_RAND\_B\_6 = (COMB\_RAND\_B)XOR(Kinit\_6) \quad (e6)$$

$$LK\_RAND\_B\_7 = (COMB\_RAND\_B)XOR(Kinit\_7) \quad (e7)$$

In response to the successful negotiation between the master and the slave on setting of the composite key to the link key, the master and the slave individually generate composite keys.

The master executes the single key algorithm (E21) to compute possible options of temporary single key of the master LK_KA_1 to LK_KA_7 and possible options of temporary single key of the slave LK_KB_1 to LK_KB_7 as shown by Expressions (f1) to (f7) and (g1) to (g7) given below:

$$LK\_KA\_1 = E21(LK\_RAND\_A\_1, BD\_ADDR\_A) \quad (f1)$$

$$LK\_KA\_2 = E21(LK\_RAND\_A\_2, BD\_ADDR\_A) \quad (f2)$$

$$LK\_KA\_3 = E21(LK\_RAND\_A\_3, BD\_ADDR\_A) \quad (f3)$$

$$LK\_KA\_4 = E21(LK\_RAND\_A\_4, BD\_ADDR\_A) \quad (f4)$$

$$LK\_KA\_5 = E21(LK\_RAND\_A\_5, BD\_ADDR\_A) \quad (f5)$$

$$LK\_KA\_6 = E21(LK\_RAND\_A\_6, BD\_ADDR\_A) \quad (f6)$$

$$LK\_KA\_7 = E21(LK\_RAND\_A\_7, BD\_ADDR\_A) \quad (f7)$$

$$LK\_KA\_1 = E21(LK\_RAND\_A\_1, BD\_ADDR\_A) \quad (f1)$$

$$LK\_KA\_2 = E21(LK\_RAND\_A\_2, BD\_ADDR\_A) \quad (f2)$$

$$LK\_KA\_3 = E21(LK\_RAND\_A\_3, BD\_ADDR\_A) \quad (f3)$$

$$LK\_KA\_4 = E21(LK\_RAND\_A\_4, BD\_ADDR\_A) \quad (f4)$$

$$LK\_KA\_5 = E21(LK\_RAND\_A\_5, BD\_ADDR\_A) \quad (f5)$$

$$LK\_KA\_6 = E21(LK\_RAND\_A\_6, BD\_ADDR\_A) \quad (f6)$$

$$LK\_KA\_7 = E21(LK\_RAND\_A\_7, BD\_ADDR\_A) \quad (f7)$$

Exclusive ORs (XORs) of the possible options of the temporary single key of the master LK_KA_1 to LK_KA_7 and the possible options of the temporary single key of the slave LK_KB_1 to LK_KB_7 give possible options of composite key Kcomb_1 to Kcomb_7 as shown by Expressions (h1) to (h7) given below:

$$Kcomb\_1 = (LK\_KA\_1)XOR(LK\_KB\_1) \quad (h1)$$

$$Kcomb\_2 = (LK\_KA\_2)XOR(LK\_KB\_2) \quad (h2)$$

$$Kcomb\_3 = (LK\_KA\_3)XOR(LK\_KB\_3) \quad (h3)$$

$$Kcomb\_4 = (LK\_KA\_4)XOR(LK\_KB\_4) \quad (h4)$$

$$Kcomb\_5 = (LK\_KA\_5)XOR(LK\_KB\_5) \quad (h5)$$

$$Kcomb\_6 = (LK\_KA\_6)XOR(LK\_KB\_6) \quad (h6)$$

$$Kcomb\_7 = (LK\_KA\_7)XOR(LK\_KB\_7) \quad (h7)$$

Similarly the slave executes the single key algorithm (E21) to compute a temporary single key of the master LK_KA_trm and a temporary single key of the slave LK_KB_trm as shown by Expressions (i1) and (j1) given below:

$$LK\_KA\_trm = E21(LK\_RAND\_A\_trm, BD\_ADDR\_A) \quad (i1)$$

$$LK\_KB\_trm = E21(LK\_RAND\_B\_trm, BD\_ADDR\_B) \quad (j1)$$

An exclusive OR (XOR) of the temporary single key of the master LK_KA_trm and the temporary single key of the slave LK_KB_trm gives a composite key Kcomb_trm as shown by Expression (k1) given below:

$$Kcomb\_trm = (LK\_KA\_trm)XOR(LK\_KB\_trm) \quad (k1)$$

The possible options of the composite key Kcomb_1 to Kcomb_7 generated by the master are set to possible options of the link key Linkey and are registered in the non-illustrated memory of the master. The composite key Kcomb_trm generated by the slave is set to the link key Linkey and is registered in the non-illustrated memory of the slave.

(2) Connection Authentication Process

Connection authentication is then performed with the link keys individually generated and set by the master and the slave as shown in FIG. 9. The slave first gives an authentication request to the master and the master then gives an authentication request to the slave for mutual connection authentication.

In the same manner as the principle of connection authentication shown in FIG. 6, the master generates an authentication challenge random number AU_RAND and sends the authentication challenge random number AU_RAND on a control packet 'LMP_au_rand' to the slave. The master also executes the connection authentication algorithm (E1) to compute an authentication response parameter. Unlike the procedure of the principle, however, the master computes seven possible options of the authentication response parameter SRES_1 to SRES_7 corresponding to the seven possible options of the composite key Kcomb_1 to Kcomb_7, which are set to the possible options of the link key Linkey, as shown by Expressions (m1) to (m7) given below:

$$SRES\_1 = E1(Kcomb\_1, BD\_ADDR\_B, AU\_RAND) \quad (m1)$$

$$SRES\_2 = E1(Kcomb\_2, BD\_ADDR\_B, AU\_RAND) \quad (m2)$$

$$SRES\_3 = E1(Kcomb\_3, BD\_ADDR\_B, AU\_RAND) \quad (m3)$$

$$SRES\_4 = E1(Kcomb\_4, BD\_ADDR\_B, AU\_RAND) \quad (m4)$$

$$SRES\_5 = E1(Kcomb\_5, BD\_ADDR\_B, AU\_RAND) \quad (m5)$$

$$SRES\_6 = E1(Kcomb\_6, BD\_ADDR\_B, AU\_RAND) \quad (m6)$$

$$SRES\_7 = E1(Kcomb\_7, BD\_ADDR\_B, AU\_RAND) \quad (m7)$$

The slave receives the authentication challenge random number AU_RAND and computes an authentication response parameter SRES_trm as shown by Expression (n1)

given below in the same manner as the principle of connection authentication discussed above:

$$SRES\_trm = E1(Kcomb\_trm, BD\_ADDR\_B, AU\_RAND) \quad (n1)$$

The slave sends the computed authentication response parameter SRES_trm on a control packet 'LMP_sres' to the master to request the master to perform connection authentication.

The master receives the authentication response parameter SRES_trm and successively compares the received authentication response parameter SRES_trm with the computed possible options of the authentication response parameter SRES_1 to SRES_7 to find the matching option of the authentication response parameter. In this example, only the $1^{st}$ option of the authentication response parameter SRES_1 matches with the received authentication response parameter SRES_trm. This completes connection authentication of the $1^{st}$ digital camera CM1 as the slave by the server PSV as the master in response to the connection authentication request from the slave. This connection authentication gives one-to-one mapping of the $1^{st}$ digital camera CM1 to the $1^{st}$ process PS1, which is related to the $1^{st}$ PIN code PIN_1 used for computation of the $1^{st}$ option of the authentication response parameter SRES_1.

On completion of the connection authentication in response to the connection authentication request from the $1^{st}$ digital camera CM1 as the slave to the server PSV as the master, connection authentication is performed in response to a connection authentication request from the server PSV as the master to the $1^{st}$ digital camera CM1 as the slave. In the same manner as the principle of connection authentication shown in FIG. 6, the slave generates an authentication challenge random number AU_RAND and sends the authentication challenge random number AU_RAND in the control packet 'LMP_au_rand' to the master. The slave also executes the connection authentication algorithm (E1) to compute the authentication response parameter SRES_trm as shown by Expression (n1) given above.

The master receives the authentication challenge random number AU_RAND and executes the connection authentication algorithm (E1) with the link key Linkey (=Kcomb_1 in this example), which is specified by the connection authentication request from the slave, to compute the authentication response parameter SRES_1 as shown by Expression (m1) given above. The master sends the computed authentication response parameter SRES_1 in the control packet 'LMP_sres' to the slave to request the slave to perform connection authentication.

The slave receives the authentication response parameter SRES_1 and compares the received authentication response parameter SRES_1 with the computed authentication response parameter SRES_trm for matching. This completes authentication of the master performed by the slave.

The successful authentication by both the master and the slave completes the connection authentication.

The other digital cameras CM2 to CM7 also perform the connection authentication according to the above procedure. The master is not required to use all the seven possible options of the authentication response parameter, which are generated corresponding to the seven possible options of the composite key, for connection authentication of each of the seven digital cameras CM1 to CM7. The matching options of the authentication response parameter in the previous connection authentication may be excluded from the options for matching in the subsequent connection authentication.

A.3. Effects

In the procedure of this embodiment described above, in response to the connection authentication requests from the $1^{st}$ to the $7^{th}$ digital cameras CM1 to CM7 as the slaves, the sever PSV as the master performs connection authentication of the $1^{st}$ to the $7^{th}$ digital cameras CM1 to CM7, while identifying the PIN codes input respectively into the $1^{st}$ to the $7^{th}$ digital cameras CM1 to CM7. The PIN code management module 24 manages the PIN codes PIN_1 to PIN_7 allocated to the $1^{st}$ to the $7^{th}$ processes PS1 to PS7. The $1^{st}$ to the $7^{th}$ processes PS1 to PS7 utilized by the users U1 to U7 of the respective digital cameras CM1 to CM7 are thus one-to-one mapped to the $1^{st}$ to the $7^{th}$ digital cameras CM1 to CM7.

The connection authentication of this embodiment requires the user to enter only one simple PIN code into the own digital camera. The user is then allowed to make the BT wireless communication with only one specified process.

In the connection authentication of this embodiment, the sequence of transmission of the control packets between the server PSV as the master and the digital camera as the slave is consistent with the sequence described in the principle of connection authentication. The digital camera as the slave is thus not required to have any special mechanism for the connection authentication of this embodiment but advantageously utilizes the general BT communication functions to receive the print service provided by the print service providing system of the embodiment.

The above example regards the connection authentication between the server as the master and the digital camera as the slave. This relationship is, however, not essential, and the connection authentication may be performed according to the same procedure between the digital camera as the master and the server as the slave.

B. Second Embodiment

B.1. Configuration of Print Service Providing System

A server PSV' as a BT access point (base station) and digital cameras CM1' to CM7' as BT terminals (wireless communication terminals) are constructed as discussed below in a print service providing system of a second embodiment.

Figure 10:
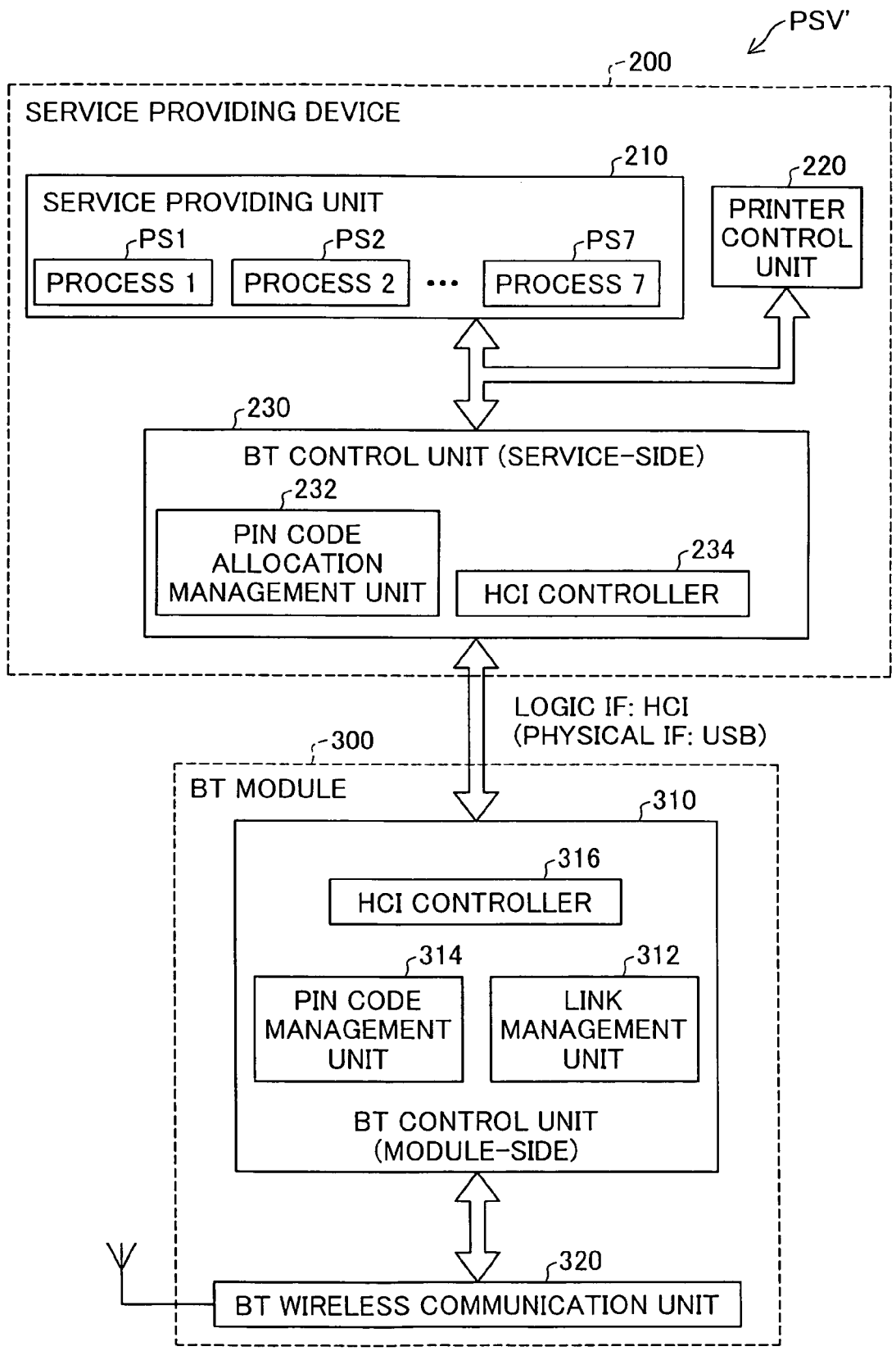
FIG. 10 is a functional block diagram schematically illustrating the configuration of a server PSV'.

FIG. 10 is a functional block diagram schematically illustrating the configuration of the server PSV'. The server PSV' includes a computer 200 as a service providing device that provides print services and a BT module 300 that is connected to the computer 200 and makes BT wireless communication.

The service providing device 200 and the BT module 300 may be interconnected by a physical IF (interface), such as a UART (Universal Asynchronous Receiver Transmitter) or a USB (Universal Serial Bus), and are connected by the USB in this embodiment.

The service providing device 200 naturally includes internal storage devices and various control modules, as well as diversity of peripheral devices, for example, external storage devices and wired communication devices, and interfaces, for example, display interfaces and input interfaces, generally included in the computer. These components are, however, not directly related to the characteristics of the invention and are thus neither illustrated nor explained here.

The service providing device 200 includes a service providing unit 210, a printer control unit 220, and a BT control unit 230. Like the service providing module 40 of the first embodiment shown in FIG. 2, the service providing unit 210 carries out $1^{st}$ to the $7^{th}$ processes PS1 to PS7 to control the print services simultaneously provided to seven users U1 to U7. The 1st to the 7th processes PS1 to PS7 display a guidance window for providing the print services on corresponding 1st to 7th monitors DP1 to DP7 (not shown). There are 1st to 7th input devices IP1 to IP7 (not shown), for example, touch panels or tablets, corresponding to the 1st to the 7th monitors DP1 to DP7. In response to entry and selection by each of the users U1 to U7 in the guidance window displayed on the corresponding one of the monitors DP1 to DP7, the corresponding one of the processes PS1 to PS7 makes the required print service. Like the printer control module 50 of the first embodiment shown in FIG. 2, the printer control unit 220 controls the operations of a printer PR (not shown) in response to commands from each of the processes PS1 to PS7 in the service providing unit 210, so as to implement printing. The BT control unit 30 controls wireless communication made by the BT module 300.

The BT module 300 includes a BT control unit 310 and a BT wireless communication unit 320. The BT wireless communication unit 320 has the functions of actually receiving and sending data by wireless and is typically a transceiver. The BT control unit 310 controls wireless communication made by the BT wireless communication unit 320 according to the control by the BT control unit 230 of the service providing device 200.

In the description below, the BT control unit 230 of the service providing device 200 and the BT control unit 310 of the BT module 300 may respectively be called the 'service-side BT control unit 230' and the 'module-side BT control unit 310'.

The service-side BT control unit 230 has an HCI controller 234, whereas the module-side BT control unit 310 has an HCI controller 316. These HCI controllers 234 and 316 are logic IFs mounted on the physical IFs for connecting the service providing device 200 with the BT module 300, and control communication between the service-side BT control unit 230 and the module-side BT control unit 310 according to an HCI (Host Control Interface) defined in the BT communication standard. In the description below, the HCI controller 234 of the service-side BT control unit 230 and the HCI controller 316 of the module-side BT control unit 310 may respectively be called the 'service-side HCI controller 234' and the 'module-side HCI controller 316'.

The service-side BT control unit 230 further includes a PIN code allocation management unit 232, whereas the module-side BT control unit 310 further includes a PIN code management unit 314. The PIN code allocation management unit 232 generates multiple different PIN codes (multiple different pieces of identification information) to be allocated to the respective processes PS1 to PS7. The PIN code allocation management unit 232 notifies the PIN code management unit 314 of the allocated PIN codes via the respective HCI controllers 234 and 316. The service-side BT control unit 230 receives information representing a mapping of connection handles for identifying the respective BT terminals as the other side of communication to the PIN codes used for connection authentication of communication from the module-side BT control unit 310 and manages the received information.

The PIN code management unit 314 holds and manages the PIN codes notified by the PIN code allocation management unit 232 via the service-side HCI controller 234 and the module-side HCI controller 316.

The module-side BT control unit 310 also includes a link management unit 312. The link management unit 312 manages required connection authentication for establishment of a communication link between each of the BT terminals (the digital cameras CM1' to CM7' in this embodiment) and the server PSV' as the BT access point. The functions of the link management unit 312 are identical with the link management module 22 of the first embodiment shown in FIG. 2.

As clearly understood from the above explanation, the combination of the service-side BT control unit 230 and the module-side BT control unit 310 is equivalent to the BT control module 20 (see FIG. 2) in the server PSV of the first embodiment.

Figure 11:
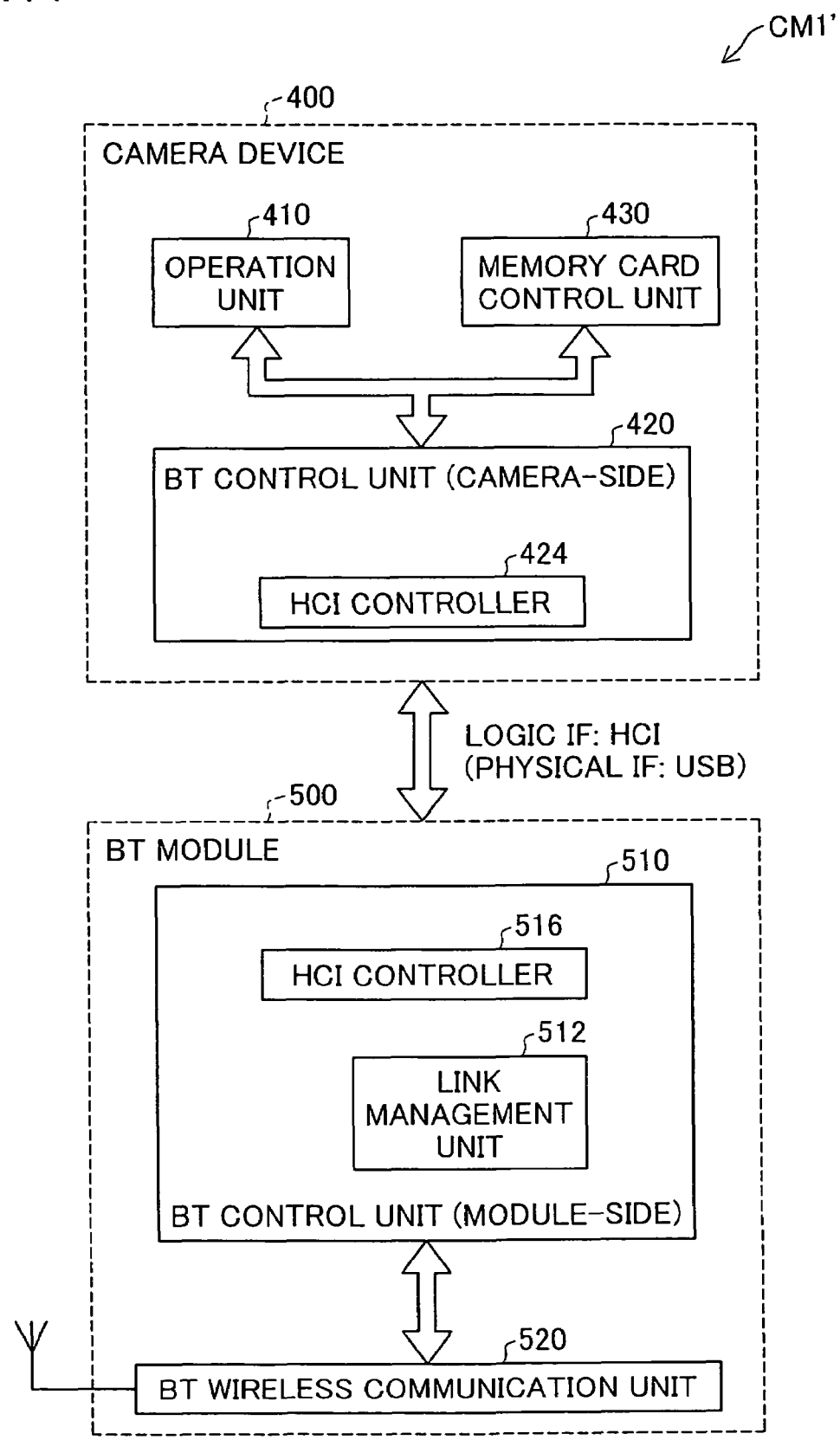
FIG. 11 is a functional block diagram schematically illustrating the configuration of a digital camera CM1'.

FIG. 11 is a functional block diagram schematically illustrating the configuration of the digital camera CM1'. The digital camera CM1' includes a computer 400 as a camera device having imaging functions and a BT module 500 that is connected to the computer 400 and makes BT wireless communication.

The camera device 400 and the BT module 500 may be interconnected via a physical IF, such as a UART or a USB, and are connected by the USB in this embodiment.

The illustration of FIG. 11 shows only part of the structure of the camera device 400 related to the BT wireless communication with the server PSV', and essential components of the imaging device, for example, the imaging functions, are omitted from the illustration.

The camera device 400 includes an operation unit 410, a BT control unit 420, and a memory card control unit 430. Like the operation unit 120 of the first embodiment shown in FIG. 3, the operation unit 410 includes input means, such as switches and a touch panel, for operations of the digital camera and display means. The memory card control unit 430 controls writing and reading of image data and other diverse data into and from a non-illustrated memory card MC, like the memory card control module 150 of the first embodiment shown in FIG. 3. The BT control unit 420 controls wireless communication made by the BT module 500.

The BT module 500 includes a BT control unit 510 and a BT wireless communication unit 520. The BT wireless communication unit 520 has the functions of actually receiving and sending data by wireless and is typically a transceiver. The BT control unit 510 controls wireless communication made by the BT wireless communication unit 520 according to the control by the BT control unit 420 of the camera device 400.

In the description below, the BT control unit 420 of the camera device 400 and the BT control unit 510 of the BT module 500 may respectively be called the 'camera-side BT control unit 420' and the 'module-side BT control unit 510'.

The camera-side BT control unit 420 has an HCI controller 424, whereas the module-side BT control unit 510 has an HCI controller 516. These HCI controllers 424 and 516 are logic IFs mounted on the physical IFs for connecting the camera device 400 with the BT module 500, and control communication between the camera-side BT control unit 420 and the module-side BT control unit 510 according to the HCI (Host Control Interface) defined in the BT communication standard. In the description below, the HCI controller 424 of the camera-side BT control unit 420 and the HCI controller 516 of the module-side BT control unit 510 may respectively be called the 'camera-side HCI controller 424' and the 'module-side HCI controller 516'.

The module-side BT control unit 510 further includes a link management unit 512. The link management unit 512 manages required connection authentication for establishment of a communication link with the server PSV' as the BT access point. The functions of the link management unit 512 are identical with the link management module 132 of the first embodiment shown in FIG. 3.

Image data stored in the non-illustrated memory card MC are transferred to the server PSV' via the camera-side BT control unit 420 and the module-side BT control unit 510.

As clearly understood from the above explanation, the combination of the camera-side BT control unit 420 and the module-side BT control unit 510 is equivalent to the BT control module 130 (see FIG. 3) in the digital camera CM1 of the first embodiment.

In the print service providing system of the second embodiment, the other digital cameras CM2' to CM7' have the same structure related to the wireless communication with the server PSV' as that of the digital camera CM1' shown in FIG. 11.

Like the print service providing system of the first embodiment (FIG. 1), the print service providing system of the second embodiment including the server PSV' connecting with the $1^{st}$ to the $7^{th}$ digital cameras CM1' to CM7' enables each user to utilize the process provided through the display on the monitor and receive the individual print service.

The connection authentication executed in the print service providing system of the second embodiment is described below in two different situations, that is, connection authentication at establishment of communication links and connection authentication after establishment of communication links.

B.2. Connection Authentication at Establishment of Links

The description sequentially regards potential problems arising in connection authentication at establishment of communication links (ACL (Asynchronous Connection-Less) links) according to the principle of the BT communication standard and the procedure of connection authentication of this embodiment.

B.2.1. Problems

Figure 12:
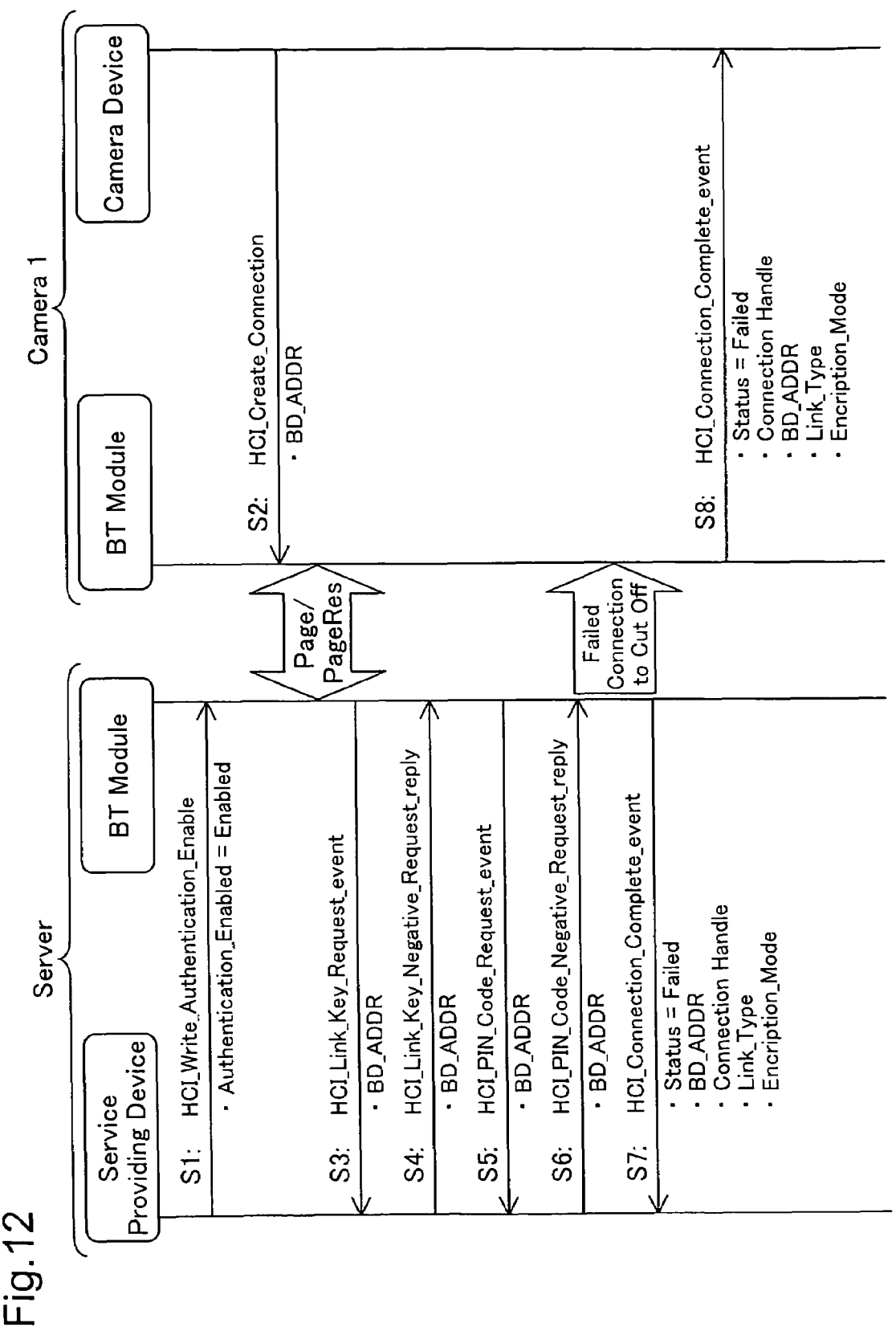
FIG. 12 shows potential problems arising in connection authentication performed at establishment of communication links according to the principle of the BT communication standard.

FIG. 12 shows potential problems arising in connection authentication performed at establishment of communication links according to the principle of the BT communication standard. FIG. 12 shows the situation of connection authentication on the assumption that the PIN code allocation management unit 232 and the PIN code management unit 314 characteristic of the embodiment are omitted respectively from the service-side BT control unit 230 and from the module-side BT control unit 310 in the server PSV' shown in FIG. 10. In the situation of FIG. 12, the service providing unit 210 provides the $1^{st}$ to the $7^{th}$ processes PS1 to PS7 to connect the digital cameras CM1' to CM7' possessed by the seven users U1 to U7 with this modified server PSV'. FIG. 12 specifically shows connection authentication between the $1^{st}$ digital camera CM1' and the modified server PSV' in mutual connection authentications between the respective digital cameras CM1' to CM7' and the modified server PSV'. The $1^{st}$ to the $7^{th}$ processes PS1 to PS7 of the service providing unit 210 provide the $1^{st}$ to the $7^{th}$ users U1 to U7 with PIN codes to be input into the $1^{st}$ to the $7^{th}$ digital cameras CM1' to CM7' through the displays on the respective monitors (not shown). In the description below, this modified server PSV' may simply be called the server, and the $1^{st}$ to the $7^{th}$ digital cameras CM1' to CM7' may simply be called the cameras 1 to 7. The digital cameras may otherwise be called the BT terminals.

For establishment of a communication link, at a first step (S1) in the server (see FIG. 10), the service-side HCI controller 234 of the service providing device 200 enables a command parameter 'Authentication_Enable' and sends a control command 'HCI_Write_Authentication_Enable' to the module-side HCI controller 316 of the BT module 300. The command parameter 'Authentication_Enable' is enabled or disabled for connection authentication at establishment of communication links. The output of the control command 'HCI_Write_Authentication_Enable' triggers authentication in the course of establishment of a communication link between the server and the BT terminal (camera 1). The service providing device 200 and the BT module 300 in the server make communication via the service-side HCI controller 234 and the module-side HCI controller 316, as described previously. In the description below, the expression of 'from the service-side HCI controller 234 of the service providing device 200 to the module-side HCI controller 316 of the BT module 300' may be abbreviated as 'from the service providing device 200 to the BT module 300' or as 'from the service-side BT control unit 230 to the module-side BT control unit 310'.

At a second step (S2) in the camera 1 (see FIG. 11), the camera-side HCI controller 424 of the camera device 400 sends a control command 'HCI_Create_Connection' with the BT address of the server as a command parameter (parameter name 'BD_ADDR') to the module-side HCI controller 516 of the BT module 500. This triggers a paging process to send a page from the camera 1 to the server. The server correspondingly sends back a page response to the camera 1. The camera device 400 and the BT module 500 in the camera 1 make communication via the camera-side HCI controller 424 and the module-side HCI controller 516, as described previously. In the description below, the expression of 'from the camera-side HCI controller 424 of the camera device 400 to the module-side HCI controller 516 of the BT module 500' may be abbreviated as 'from the camera device 400 to the BT module 500' or as the 'camera-size BT control unit 420 to the module-side BT control unit 510'.

The page and the page response transmitted between the server and the camera 1 start connection authentication between the link management unit 312 in the module-side BT control unit 310 of the server and the link management unit 512 in the module-side BT control unit 510 of the camera 1, since the authentication setting has been enabled at the first step (S1).

In the first execution of connection authentication, the link management unit 312 in the module-side BT control unit 310 of the server does not have a link key required for authentication described in the first embodiment. At a third step (S3) in the server, the BT module 300 sends an event 'HCI_Link_key_Request_event' with the BT address of the BT terminal to be authenticated (camera 1 in this example) as the command parameter (parameter name 'BD_ADDR') to the service providing device 200 as a request for the link key.

As mentioned previously in the first embodiment as the problems of the conventional connection authentication, the service-side BT control unit 230 is not informed of the BT address of the BT terminal (camera 1) and accordingly can not send back a corresponding link key. At a fourth step (S4) in the server, the service providing device 200 sends a control command 'HCI_Link_Key_Negative_Request_reply' to the BT module 300 to give a negative response to the request for the link key. After the first connection authentication, the service-side BT control unit 230 possesses the information on the mapping of the BT address of the BT terminal to the link key and can thus send back the link key in a control command 'HCI_Link_Key_Request_reply' to the BT module 300.

The link management unit 312 in the module-side BT control unit 310 of the server starts the pairing process as described in the first embodiment. A PIN code is essential for this pairing process. At a fifth step (S5) in the server, the BT module 300 sends an event 'HCI_PIN_Code_Request_event' with the BT address of the camera 1 as the command parameter 'BD_ADDR' to the service providing device 200 as a request for the PIN code.

As mentioned previously in the first embodiment as the problems of the conventional connection authentication, the service-side BT control unit 230 is not informed of the BT address of the BT terminal (camera 1). The service-side BT control unit 230 possesses the information on the PIN codes provides by the respective processes PS1 to PS7, while not being notified of the mapping of the PIN codes to the BT addresses inherent to the BT terminals (digital cameras CM1' to CM7') that have received the inputs of the PIN codes. The service-side BT control unit 230 can thus not send back a PIN code corresponding to the BT address of the request sender. At a sixth step (S6) in the server, the service providing device 200 sends a control command 'HCI_PIN_Code_Negative_Request_reply' to give a negative response to the request for the PIN code.

The link management unit 312 in the module-side BT control unit 310 of the server can thus not implement the pairing process or the connection authentication process described in the first embodiment and fails in connection between the server and the camera 1. At a seventh step (S7) in the server, the BT module 300 sends an event 'HCI_Connection_Complete_event', which includes a status (parameter name 'Status') representing the result of establishment of a communication link (succeeded/failed), the BT address of the camera 1 (parameter name 'BD_ADDR'), and a connection handle (parameter name 'Connection Handle') as parameters, to the service providing device 200, which is thus informed of failed connection. At an eighth step (S8) in the camera 1, the BT module 500 similarly sends an event 'HCI_Connection_Complete_event' including the status, the BT address of the server, and the connection handle as the parameters to the camera device 400, which is thus informed of failed connection.

The above description regards the process of connection authentication at establishment of communication links between the server and the BT terminals (digital cameras CM1' to CM7'), on the assumption that the PIN code allocation management unit 232 and the PIN code management unit 314 are omitted respectively from the service-side BT control unit 230 and from the module-side BT control unit 310 of the server. In the server of this partly omitted configuration, the module-side BT control module 310 of the BT module 300 sends an inquiry about the PIN code of each BT terminal to be authenticated to the service-side BT control unit 230 of the service providing device 200. The service-side BT control unit 230 can not, however, send back the required PIN code to the module-side BT control unit 310. This results in failed connection authentication.

The system of the second embodiment adopts the procedure described below to implement connection authentication at establishment of communication links.

B.2.2. Connection Authentication of Embodiment

As in the case of the print service providing system of the first embodiment (FIG. 1), the following description is on the assumption that the service providing unit 210 of the server PSV' provides the $1^{st}$ to the $7^{th}$ processes PS1 to PS7 as shown in FIG. 10. The following description specifically regards connection authentication between the $1^{st}$ digital camera CM1' (FIG. 11) and the server PSV' among connection authentications between the server PSV' and the respective digital cameras CM1' to CM7' possessed by the seven users U1 to U7.

In the system of this embodiment, the service-side BT control unit 230 in the service providing device 200 of the server PSV' has the PIN code allocation management unit 232. The PIN code allocation management unit 232 allocates the PIN codes to the respective processes PS1 to PS7 and manages their mapping. The module-side BT control unit 310 in the BT module 300 of the server PSV' has the PIN code management unit 314. The connection authentication of the embodiment is performed at establishment of communication links after registration of the PIN codes allocated by the PIN code allocation management unit 232 into the PIN code management unit 314, as described below.

(1) PIN Code Registration

Figure 13:
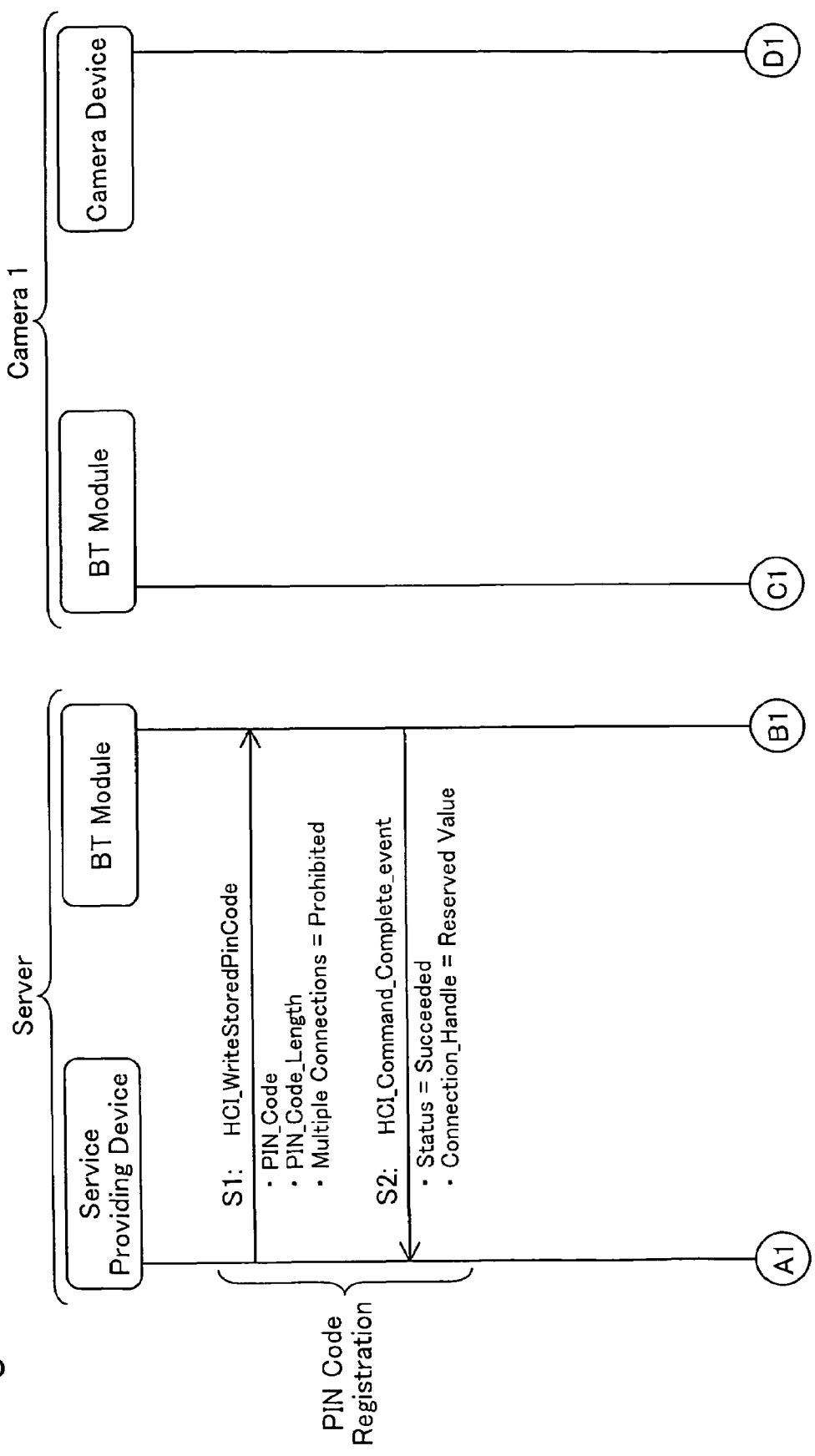
FIG. 13 shows a PIN code registration process in the procedure of connection authentication of a second embodiment performed at establishment of communication links.

FIG. 13 shows a PIN code registration process executed at establishment of communication links.

The HCI in the BT communication standard allows the user to define a control code. A user-defined control command is accordingly utilized for the PIN code registration process.

The user defines, for example, a control command 'HCI_WriteStoredCode', which is to be sent from the service-side HCI control unit 234 to the module-side HCI control unit 316. The control command specifies three parameters 'PIN_Code', 'PIN_Code_Length', and 'Multiple Connections'. The parameter 'PIN_Code' represents a PIN code allocated by the PIN code allocation management unit 232. The parameter 'PIN_Code_Length' represents the length of the PIN code. The parameter 'Multiple Connections' represents permission or prohibition of multiple connections via the identical PIN code.

The control command having the above definition is used for registration of each PIN code. At a first step (S1), the service providing device 200 sends the control command 'HCI_WriteStoredCode' to the BT module 300. The BT module 300 accordingly receives information on a PIN code allocated to one of the processes PS1 to PS7 by the PIN code allocation management unit 232, its PIN code length, and permission or prohibition of multiple connections via the PIN code. The received information is registered into the PIN code management unit 314 of the module-side BT control unit 310. At a second step (S2), the BT module 300 sends an event 'HCI_Complete_event' to the service providing device 200. The service providing device 200 is thus notified of a status representing either succeeded registration or failed registration (parameter name 'Status') and a connection handle (parameter name 'Connection_Handle'). In the case of prohibition of multiple connections, a reserved value related to only the registered PIN code is sent as the connection handle. The PIN code allocation management unit 232 manages the received connection handle representing the reserved value with the corresponding PIN code. In the case of permission of multiple connections, on the other hand, the connection handle has no significance and is set to a typically defined arbitrary value.

The first step (S1) and the second step (S2) of the registration process are repeated seven times. The seven PIN codes allocated to the $1^{st}$ to the $7^{th}$ processes PS1 to PS7 are accordingly registered as possible options usable for authentication into the PIN code management unit 314 of the module-side BT control unit 310.

Establishment of communication links and connection authentication follow the PIN code registration. The subsequent processing flow partly depends upon the permission or prohibition of multiple connections via one identical PIN code. The procedure of connection authentication in the case of prohibition of multiple connections and that in the case of permission of multiple connections are thus described separately.

(2) Establishment of Communication Links and Connection Authentication (Multiple Connections=Prohibited)

Figure 14:
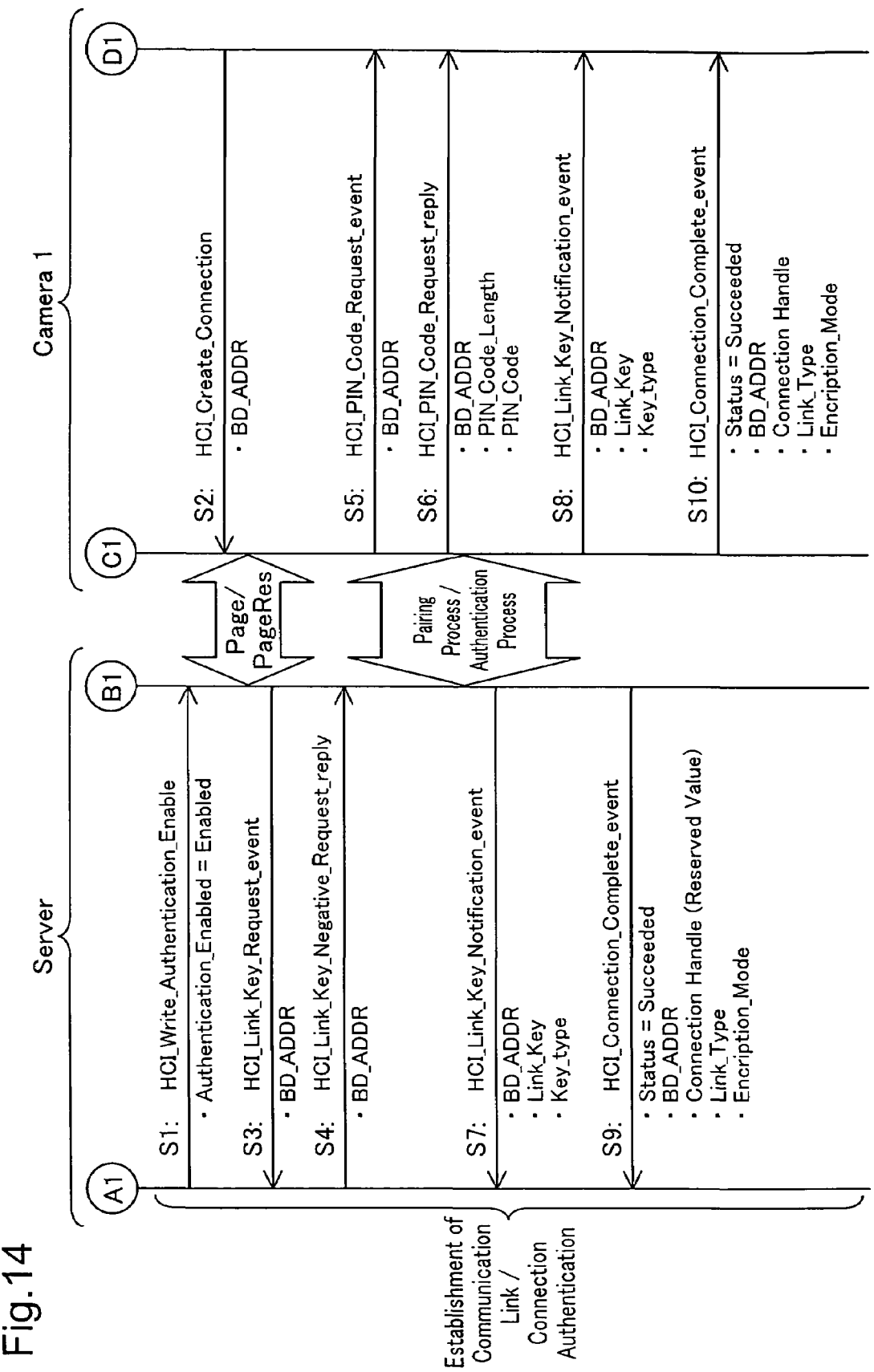
FIG. 14 shows a process of connection authentication at establishment of communication links performed after registration of PIN codes in the case of prohibition of multiple connections via one registered PIN code.

FIG. 14 shows a process of connection authentication at establishment of communication links performed after registration of PIN codes in the case of prohibition of multiple connections via one registered PIN code. This procedure of establishment of communication links basically follows the principle of the BT communication standard.

At a first step (S1) in the server (FIG. 10), the service providing device 200 sends a control command 'HCI_Write_Authentication_Enable' to the BT module 300 to enable connection authentication at establishment of a communication link. The output of the control command 'HCI_Write_Authentication_Enable' triggers authentication in the course of establishment of a communication link between the server and the BT terminal (camera 1).

At a second step (S2) in the camera 1 (FIG. 11), the camera device 400 sends a control command 'HCI_Create_Connection' with the BT address of the server as the command parameter (parameter name 'BD_ADDR') to the BT module 500. This triggers a paging process to send a page from the camera 1 to the server. The server correspondingly sends back a page response to the camera 1.

The page and the page response transmitted between the server and the camera 1 start connection authentication between the link management unit 312 in the module-side BT control unit 310 of the server (FIG. 10) and the link management unit 512 in the module-side BT control unit 510 of the camera 1 (FIG. 11). The link management unit 312 in the module-side BT control unit 310 of the server does not have a link key required for authentication described in the first embodiment. At a third step (S3) in the server, the BT module 300 sends an event 'HCI_Link_key_Request_event' with the BT address of the BT terminal to be authenticated (camera 1) as the command parameter (parameter name 'BD_ADDR') to the service providing device 200 as a request for the link key. As described previously, the service-side BT control unit 230 is not informed of the BT address of the BT terminal (camera 1) and accordingly can not send back a corresponding link key. At a fourth step (S4) in the server, the service providing device 200 sends a control command 'HCI_Link_Key_Negative_Request_reply' to the BT module 300 to give a negative response to the request for the link key.

The link management unit 312 in the module-side BT control unit 310 of the server and the link management unit 512 in the module-side BT control unit 510 of the camera 1 then execute the pairing and connection authentication processes as described in the first embodiment.

A PIN code is essential for the pairing process. The possible options of the PIN code required for connection authentication have been registered in the PIN code management unit 314 of the module-side BT control unit 310 of the server and enable execution of the connection authentication process. At a fifth step (S5) in the camera 1, the BT module 500 sends an event 'HCI_PIN_Code_Request_event' with the BT address of the server as the command parameter (parameter name 'BD_ADDR') to the camera device 400 as a request for the PIN code. At a sixth step (S6) in the camera 1, the camera device 400 sends a control command 'HCI_PIN_Code_Request_reply' to the BT module 500, which is thus notified of a PIN code (parameter name 'PIN_Code') and its PIN code length (parameter name 'PIN_Code_Length'). The PIN code and the PIN code length notified here are identical with the PIN code and the PIN code length given to the user (U1) through the display on the monitor and entered into the user's own BT terminal (camera 1). The PIN code may be entered into the camera 1 at the fifth step of inquiry about the PIN code or may be entered in advance.

As described in the first embodiment, after generation of link keys by the pairing and connection authentication processes between the server and the camera 1, at a seventh step (S7) in the server, the BT module 300 sends an event 'HCI_Link_key_Notification_event' to the service providing device 200, which is thus notified of the generated link key (parameter name 'Link_Key') and the type of the link key (parameter name 'Key_type'). Similarly at an eighth step (S8) in the camera 1, the BT module 500 sends an event 'HCI_Link_key_Notification_event' to the camera device 400, which is thus notified of the generated link key and the type of the link key.

At a ninth step (S9) in the server, the BT module 300 sends an event 'HCI_Connection_Complete_event' to the service providing device 200, which is thus notified of a status representing either a succeeded communication link or a failed communication link (parameter name 'Status') and a connection handle representing a reserved value related to the PIN code used for connection authentication (parameter name 'Connection_Handle'). Similarly at a tenth step (S10) in the camera 1, the BT module 500 sends an event 'HCI_Connection_Complete_event' to the camera device 400, which is thus notified of the status representing either a succeeded communication link or a failed communication link (parameter name 'Status') and the connection handle (parameter name 'Connection_Handle'). This establishes a communication link between the server and the camera 1 and completes the connection authentication.

The PIN code allocation management unit 232 in the service-side BT control unit 230 of the server unequivocally maps the PIN code and the connection handle to the process and manages the mapping. The server uses the connection handle notified at the ninth step (S9) to specify the PIN code of the BT terminal (camera 1) as the object of connection authentication and the process mapped to the PIN code, thus identifying the user utilizing the process as the object of connection authentication.

(3) Establishment of Communication Links and Connection Authentication (Multiple Connections=Allowed)

Figure 15:
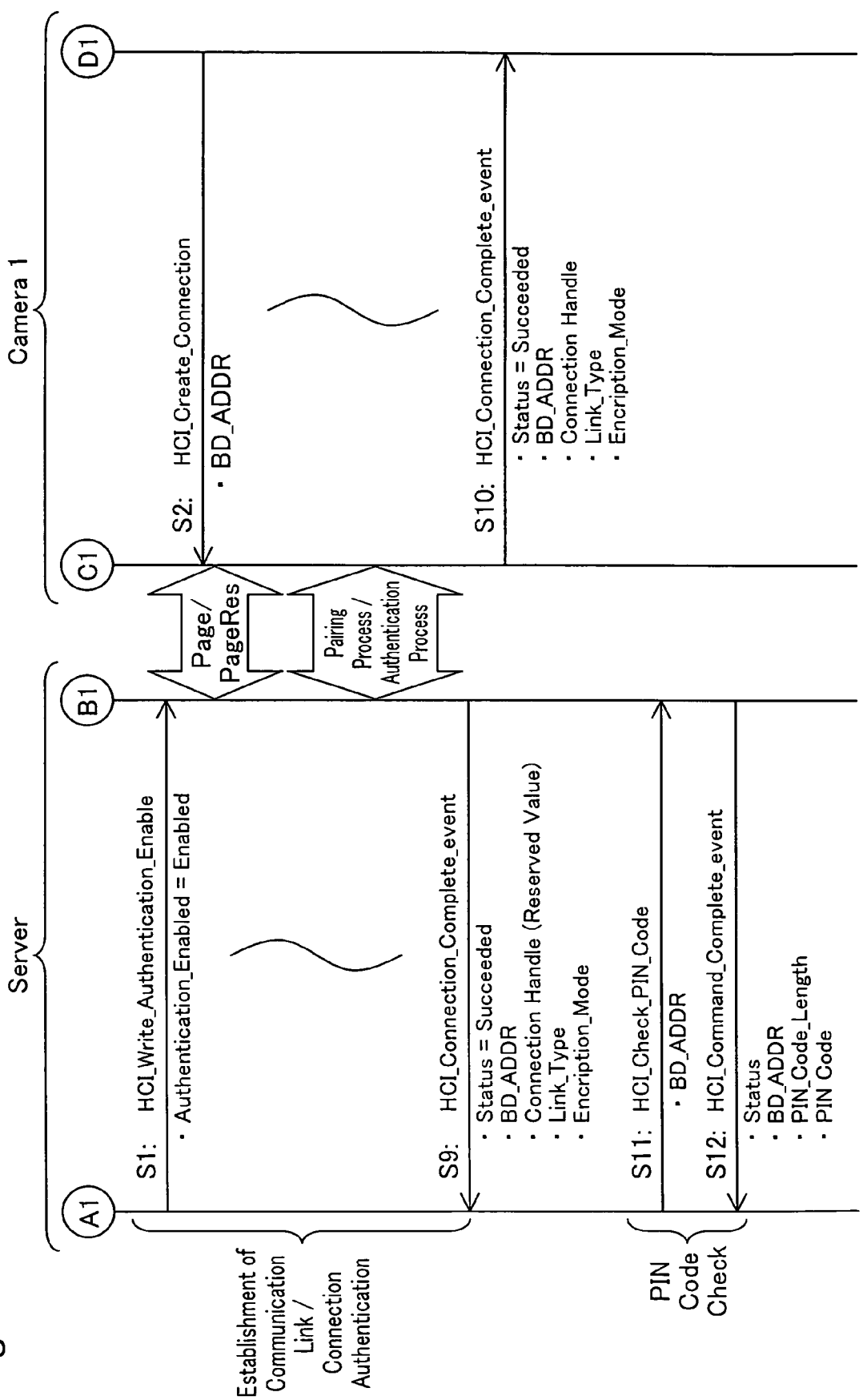
FIG. 15 shows a process of connection authentication at establishment of communication links performed after registration of PIN codes in the case of permission of multiple connections via one registered PIN code.

FIG. 15 shows a process of connection authentication at establishment of communication links performed after registration of PIN codes in the case of permission of multiple connections via one registered PIN code. The procedure of establishment of communication links in this case is basically identical with the procedure in the case of prohibition of multiple connections via one PIN code (see FIG. 14). Execution of the first step (S1) to the tenth step (S10) implements authentication in the course of establishment of a communication link between the server and the BT terminal (camera 1).

The connection handles notified at the ninth step (S9) and at the tenth step (S10) in the case of permission of multiple connections are different from the connection handles notified at the ninth step (S9) and at the tenth step (S10) in the case of prohibition of multiple connections (see FIG. 14). Each of the connection handles in this case is not a reserved value related to the PIN code used for connection authentication but is an arbitrary value typically defined in the PIN code registration process.

One identical PIN code may be used for connection authentication between the server PSV' and multiple BT terminals (digital cameras CM1' to CM7'). The connection handle in the case of permission of multiple connections is not the reserved value related to the PIN code, unlike the connection handle in the case of prohibition of multiple connections. In the case of permission of multiple connections, the PIN code and the connection handle are not unequivocally mapped to the process in the PIN code registration process. This leads to failed identification of the PIN code used for authentication and failed mapping of the connected BT terminal to the PIN code, thus causing failed identification of the mapping of the PIN code to the process.

The procedure of this embodiment accordingly allows the user to define an HCI control command.

The user defines a control command 'HCI_Check_PIN_Code', which is to be sent from the module-side HCI control unit 316 to the service-side HCI control unit 234 in the server PSV'. This control command specifies the BT address of the BT terminal as the object of connection (parameter name 'BD_ADDR').

The control command having the above definition is used for an inquiry about the PIN code. At an eleventh step (S11), the service providing device 200 sends the control command 'HCI_Check_PIN_Code' to the BT module 300 as a request for the PIN code. At a twelfth step (S12), the BT module 300 sends an event 'HCI_Command_Complete_event' to the service providing device 200, which is thus notified of the PIN code used for connection authentication of the BT terminal having the specified BT address (camera 1).

This specifies the PIN code of the BT terminal (camera 1) as the object of connection authentication and the process mapped to the PIN code, thus identifying the user utilizing the process as the object of connection authentication.

B.3. Connection Authentication after Establishment of Links

The description sequentially regards potential problems arising in connection authentication after establishment of communication links (ACL (Asynchronous Connection-Less) links) according to the principle of the BT communication standard and the procedure of connection authentication of this embodiment.

B.3.1. Problems

Figure 16:
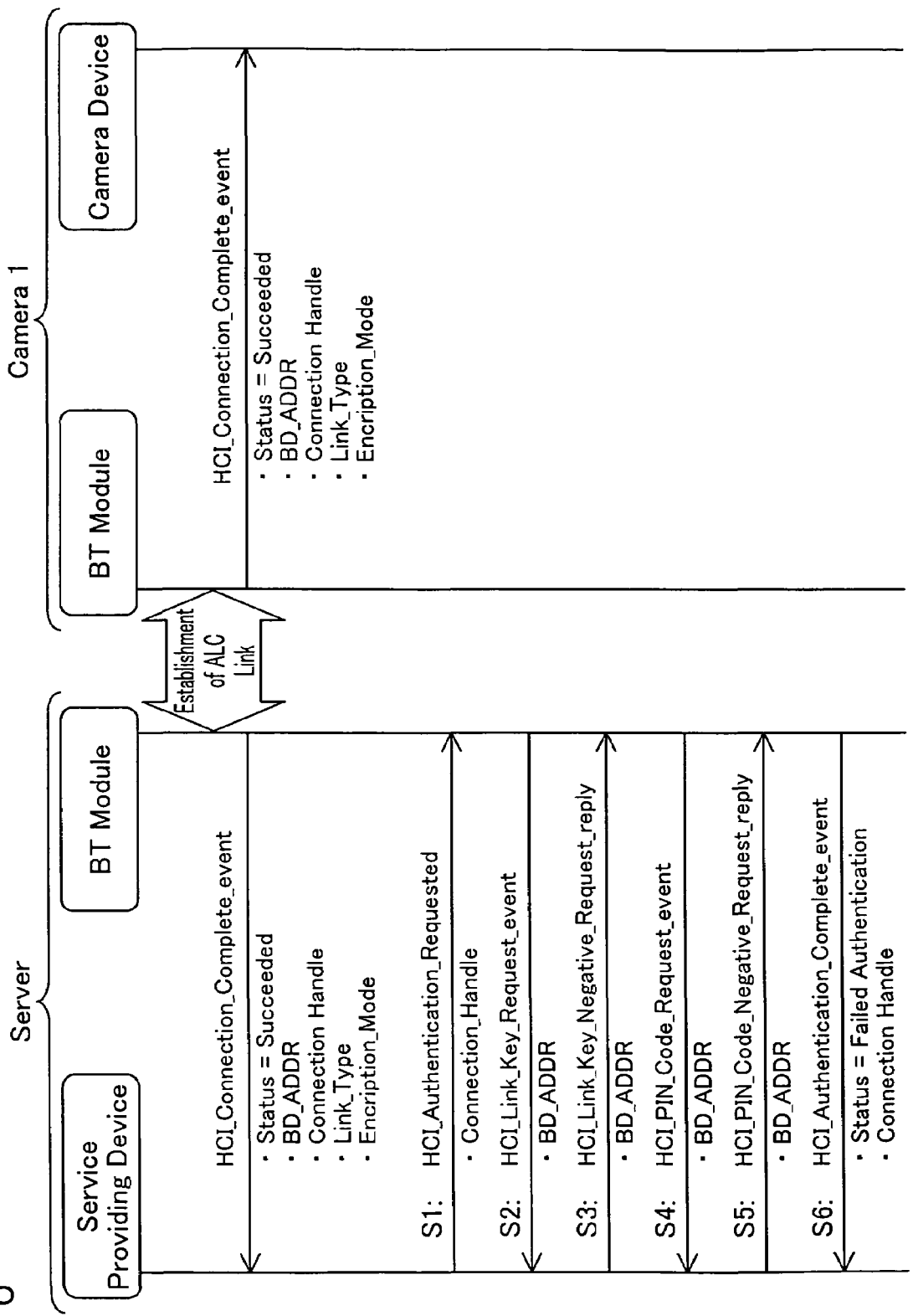
FIG. 16 shows potential problems arising in connection authentication performed after establishment of communication links according to the principle of the BT communication standard.

FIG. 16 shows potential problems arising in connection authentication performed after establishment of communication links according to the principle of the BT communication standard. As described previously in the potential problems at establishment of communication links (see FIG. 12), FIG. 16 shows the situation of connection authentication on the assumption that the PIN code allocation management unit 232 and the PIN code management unit 314 characteristic of the embodiment are omitted respectively from the service-side BT control unit 230 and from the module-side BT control unit 310 in the server PSV' shown in FIG. 10. In the situation of FIG. 16, the service providing unit 210 provides the $1^{st}$ to the $7^{th}$ processes PS1 to PS7 to connect the digital cameras CM1' to CM7' possessed by the seven users U1 to U7 with this modified server PSV'. FIG. 16 specifically shows connection authentication between the $1^{st}$ digital camera CM1' and the modified server PSV' in mutual connection authentications between the respective digital cameras CM1' to CM7'and the modified server PSV'. The $1^{st}$ to the $7^{th}$ processes PS1 to PS7 of the service providing unit 210 provide the $1^{st}$ to the $7^{th}$ users U1 to U7 with PIN codes to be input into the $1^{st}$ to the $7^{th}$ digital cameras CM1' to CM7' through the displays on the respective monitors (not shown). In the description below, this modified server PSV' may simply be called the server, and the $1^{st}$ to the $7^{th}$ digital cameras CM1' to CM7' may simply be called the cameras 1 to 7. The digital cameras may otherwise be called the BT terminals.

On establishment of a communication link (ALC link) between the server and the BT terminal (camera 1 in this example), the BT module 300 of the server (FIG. 10) sends an event 'HCI_Connection_Complete_event' to the service providing device 200, which is thus notified of a status representing either succeeded establishment or failed establishment of a communication link (parameter name 'Status'), the BT address of the connected BT terminal (camera 1) (parameter name 'BD_ADDR'), and a connection handle representing a typically defined arbitrary value (parameter name 'Connection_Handle'). Similarly the BT module 500 of the camera 1 (FIG. 11) sends an event 'HCI_Connection_Complete_event' to the camera device 400, which is thus notified of the status (parameter name 'Status'), the BT address of the server (parameter name 'BD_ADDR'), and the connection handle (parameter name 'Connection_Handle').

At a first step (S1) in the server, the service providing device 200 sends a control command 'HCI_Authentication_Requested' with the connection handle notified at establishment of a communication link as a command parameter (parameter name 'Connection_Handle') to the BT module 300. This triggers connection authentication by the link management unit 312 in the module-side BT control unit 310 of the BT module 300. The link management unit 312 does not have a link key required for authentication described in the first embodiment. At a second step (S2) in the server, the BT module 300 sends an event 'HCI_Link_key_Request_event' with the BT address of the BT terminal to be authenticated (camera 1 in this example) as the command parameter (parameter name 'BD_ADDR') to the service providing device 200 as a request for the link key. The service-side BT control unit 230 is not informed of the BT address of the BT terminal (camera 1) and accordingly can not send back a corresponding link key. At a third step (S3) in the server, the service providing device 200 sends a control command 'HCI_Link_Key_Negative_Request_reply' to the BT module 300 to give a negative response to the request for the link key.

The link management unit 312 in the module-side BT control unit 310 of the server starts the pairing process as described in the first embodiment. A PIN code is essential for this pairing process. At a fourth step (S4) in the server, the BT module 300 sends an event 'HCI_PIN_Code_Request_event' with the BT address of the camera 1 as the command parameter (parameter name 'BD_ADDR') to the service providing device 200 as a request for the PIN code.

As mentioned previously in the first embodiment as the problems of the conventional connection authentication, the service-side BT control unit 230 is not informed of the BT address of the BT terminal (camera 1). The service-side BT control unit 230 possesses the information on the PIN codes provides by the respective processes PS1 to PS7, while not being notified of the mapping of the PIN codes to the BT addresses inherent to the BT terminals (digital cameras CM1' to CM7') that have received the inputs of the PIN codes. The service-side BT control unit 230 can thus not send back a PIN code corresponding to the BT address of the request sender. At a fifth step (S5) in the server, the service providing device 200 sends a control command 'HCI_PIN_Code_Negative_Request_reply' to give a negative response to the request for the PIN code.

The link management unit 312 in the module-side BT control unit 310 of the server can thus not implement the pairing process or the connection authentication process described in the first embodiment and fails in connection authentication between the server and the camera 1. At a sixth step (S6) in the server, the BT module 300 sends an event 'HCI_Authentication_Complete_event' with a status representing either succeeded connection authentication or failed connection authentication (parameter name 'Status') and a connection handle set at the start of connection authentication (parameter name 'Connection_Handle') as command parameters to the service providing device 200. The service providing device 200 is thus notified of failed authentication.

The above description regards the process of connection authentication after establishment of communication links between the server and the BT terminals (digital cameras CM1' to CM7'), on the assumption that the PIN code allocation management unit 232 and the PIN code management unit 314 are omitted respectively from the service-side BT control unit 230 and from the module-side BT control unit 310 of the server. In the server of this partly omitted configuration, the module-side BT control module 310 of the BT module 300 sends an inquiry about the PIN code of each BT terminal to be authenticated to the service-side BT control unit 230 of the service providing device 200. The service-side BT control unit 230 can not, however, send back the required PIN code to the module-side BT control unit 310. This results in failed connection authentication.

The system of the second embodiment adopts the procedure described below to implement connection authentication after establishment of communication links.

B.3.2. Connection Authentication of Embodiment

As in the case of the print service providing system of the first embodiment (FIG. 1), the following description is on the assumption that the service providing unit 210 of the server PSV' provides the $1^{st}$ to the $7^{th}$ processes PS1 to PS7 as shown in FIG. 10. The following description specifically regards connection authentication between the $1^{st}$ digital camera CM1' and the server PSV' among connection authentications between the server PSV' and the respective digital cameras CM1' to CM7' possessed by the seven users U1 to U7.

In the procedure of connection authentication after establishment of communication links, each PIN code allocated to the PIN code allocation management unit 232 is registered in the PIN code management unit 314, prior to connection authentication, as described below.

(1) PIN Code Registration

Figure 17:
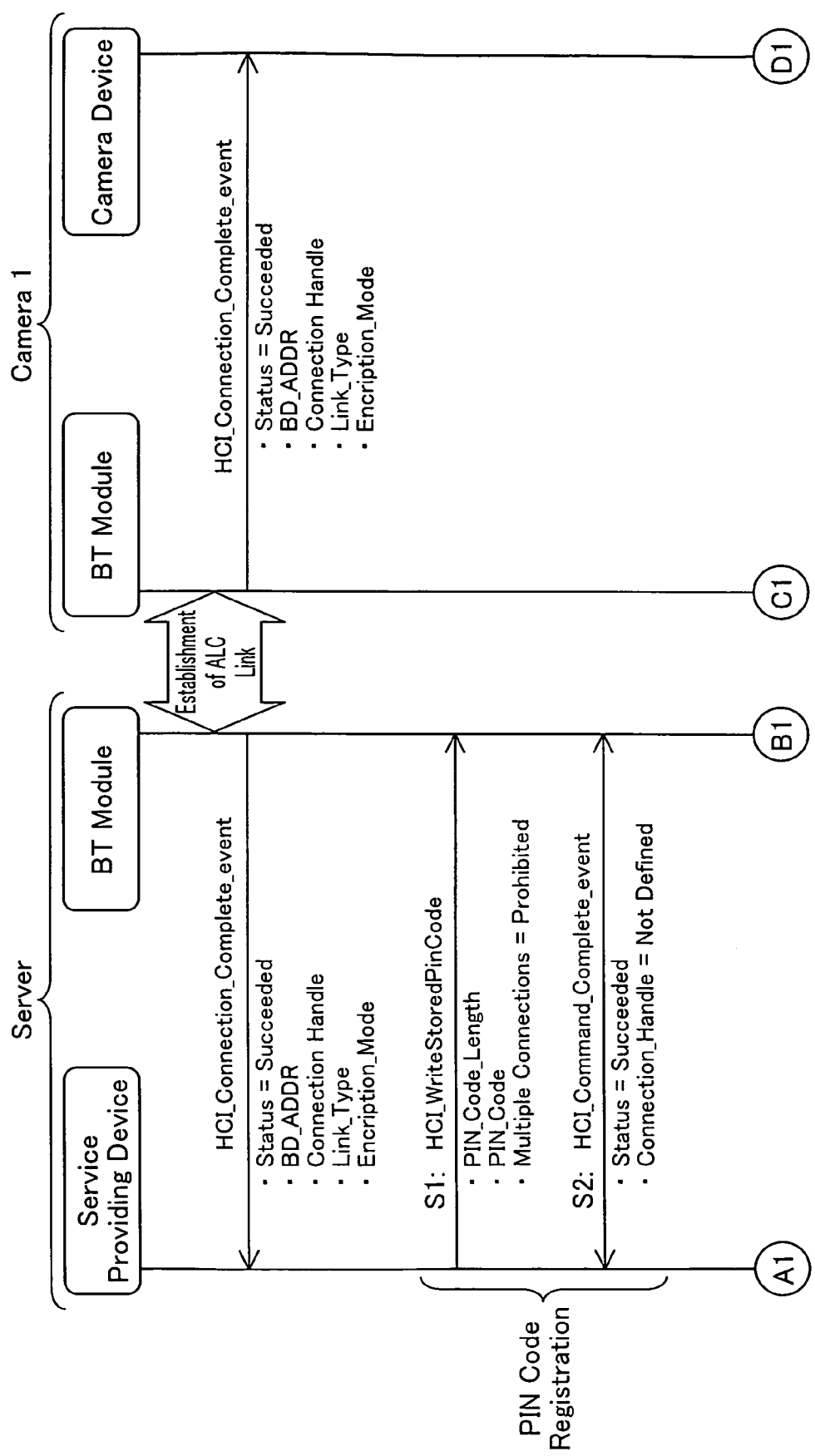
FIG. 17 shows a PIN code registration process in the procedure of connection authentication of a second embodiment performed after establishment of communication links.

FIG. 17 shows a PIN code registration process in the procedure of connection authentication of the embodiment performed after establishment of communication links.

On establishment of a communication link (ALC link), the BT module 300 of the server (FIG. 10) sends an event 'HCI_Connection_Complete_event' to the service providing device 200, which is thus notified of the status (parameter name 'Status'), the BT address (parameter name 'BD_ADDR'), and the connection handle (parameter name 'Connection_Handle'). In the same manner as the PIN code registration process at establishment of communication links (see FIG. 13), at a first step (S1) in the server, the service providing device 200 sends a control command 'HCI_WriteStoredCode' to the BT module 300. The BT module 300 accordingly receives information on a PIN code, its PIN code length, and permission or prohibition of multiple connections via the PIN code. The received information is registered into the PIN code management unit 314 of the module-side BT control unit 310. The control command 'HCI_WriteStoredCode' is identical with the user-defined control command in the procedure of connection authentication at establishment of communication links. At a second step (S2) in the server, the BT module 300 sends an event 'HCI_Complete_event' to the service providing device 200, which is thus notified of a status representing either succeeded registration or failed registration (parameter 'Status') and a connection handle (parameter name 'Connection_Handle'). The connection handle is set to a typically defined arbitrary value, regardless of permission or prohibition of multiple connections.

The first step (S1) and the second step (S2) of the registration process are repeated seven times. The seven PIN codes allocated to the $1^{st}$ to the $7^{th}$ processes PS1 to PS7 are accordingly registered as possible options usable for authentication into the PIN code management unit 314 of the module-side BT control unit 310.

Connection authentication follows the PIN code registration. The subsequent processing flow does not depend upon the permission or prohibition of multiple connections via one identical PIN code. The following description regards the case of prohibition of multiple connections.

(2) Connection Authentication (Multiple Connections= Prohibited)

Figure 18:
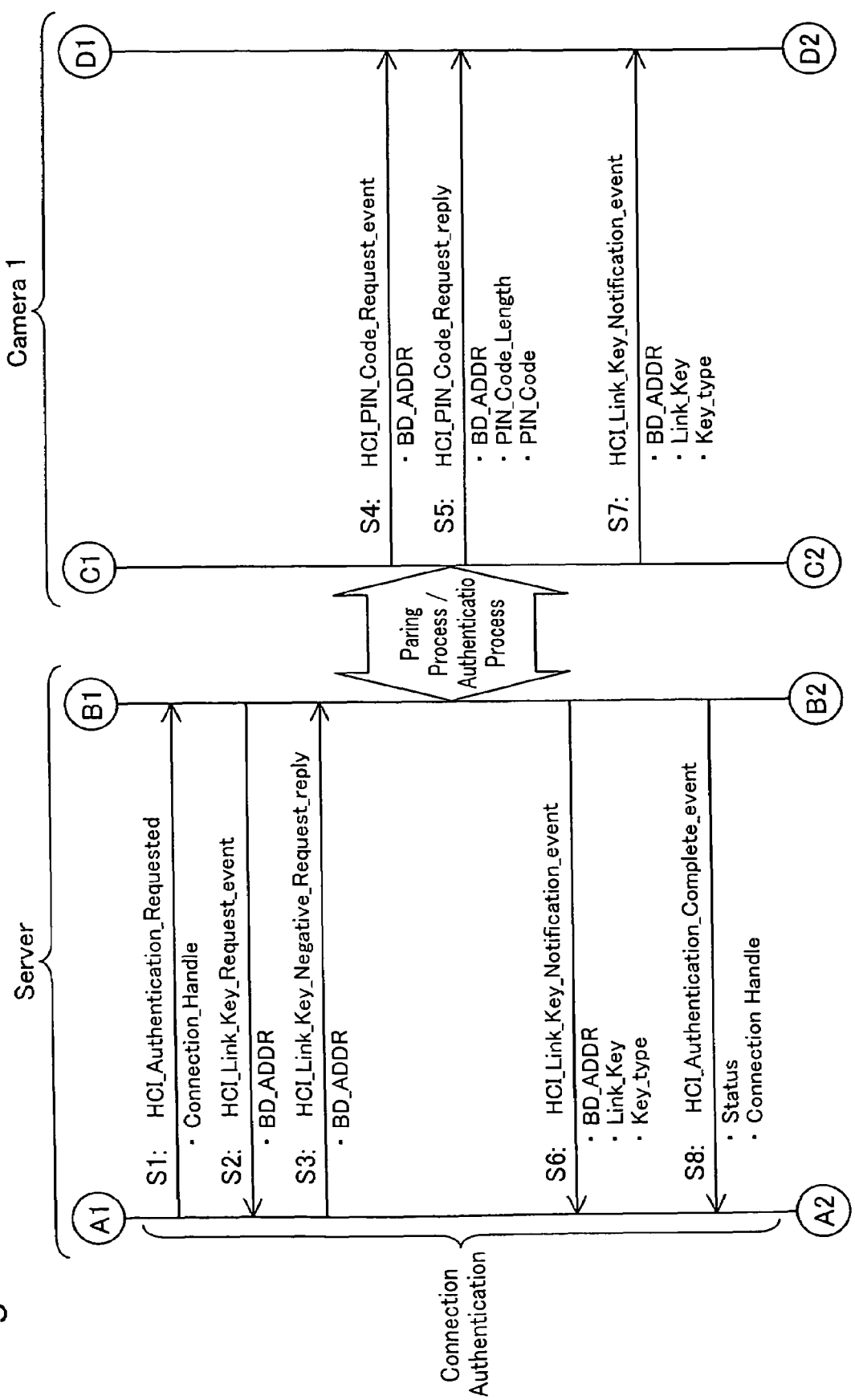
FIG. 18 shows a process of connection authentication after establishment of communication links.
Figure 19:
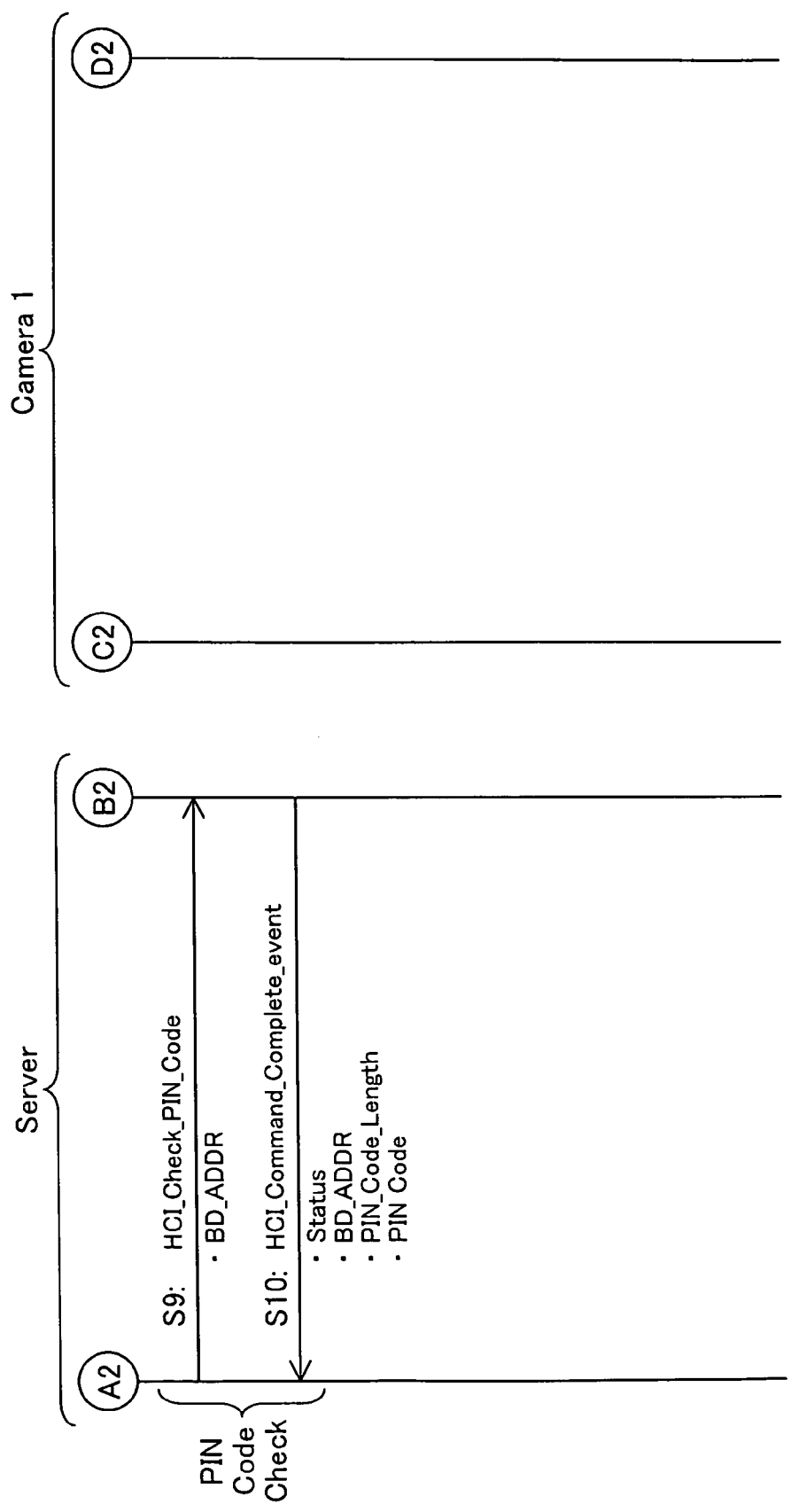
FIG. 19 shows the process of connection authentication after establishment of communication links.

FIGS. 18 and 19 show a process of connection authentication after establishment of communication links. This procedure of connection authentication basically follows the principle of the BT communication standard.

At a first step (S1) in the server (FIG. 10), the service providing device 200 sends a control command 'HCI_Authentication_Requested' with the connection handle notified at establishment of a communication link as a command parameter (parameter name 'Connection_Handle') to the BT module 300. This triggers connection authentication by the link management unit 312 in the module-side BT control unit 310 of the BT module 300 (FIG. 10). As described above in the problems, the link management unit 312 does not have a link key required for authentication described in the first embodiment. At a second step (S2) in the server, the BT module 300 sends an event 'HCI_Link_key_Request_event' with the BT address of the BT terminal to be authenticated (camera 1 in this example) as the command parameter (parameter name 'BD_ADDR') to the service providing device 200 as a request for the link key. As described above in the problems, the service-side BT control unit 230 is not informed of the BT address of the BT terminal (camera 1) and accordingly can not send back a corresponding link key. At a third step (S3) in the server, the service providing device 200 sends a control command 'HCI_Link_Key_Negative_Request_reply' to the BT module 300 to give a negative response to the request for the link key.

The link management unit 312 in the module-side BT control unit 310 of the server and the link management unit 512 in the module-side BT control unit 510 of the camera 1 then execute the pairing and connection authentication processes as described in the first embodiment.

A PIN code is essential for the pairing process. The possible options of the PIN code required for connection authentication have been registered in the PIN code management unit 314 of the module-side BT control unit 310 of the server and enable execution of the connection authentication process. At a fourth step (S4) in the camera 1, the BT module 500 sends an event 'HCI_PIN_Code_Request_event' with the BT address of the server as the command parameter (parameter name 'BD_ADDR') to the camera device 400 as a request for the PIN code. At a fifth step (S5) in the camera 1, the camera device 400 sends a control command 'HCI_PIN_Code_Request_reply' to the BT module 500, which is thus notified of a PIN code (parameter name 'PIN_Code') and its PIN code length (parameter name 'PIN_Code_Length'). The PIN code and the PIN code length notified here are identical with the PIN code and the PIN code length given to the user (U1)

through the display on the monitor and entered into the user's own BT terminal (camera 1). The PIN code may be entered into the camera 1 at the fourth step of inquiry about the PIN code or may be entered in advance.

As described in the first embodiment, after generation of link keys by the pairing and connection authentication processes between the server and the camera 1, at a sixth step (S6) in the server, the BT module 300 sends an event 'HCI_Link_key_Notification_event' to the service providing device 200, which is thus notified of the generated link key (parameter name 'Link_Key') and the type of the link key (parameter name 'Key_type'). Similarly at a seventh step (S7) in the camera 1, the BT module 500 sends an event 'HCI_Link_key_Notification_event' to the camera device 400, which is thus notified of the generated link key and the type of the link key.

At an eighth step (S8) in the server, the BT module 300 sends an event 'HCI_Authentication_Complete_event' to the service providing device 200, which is thus notified of a status representing a result of connection authentication (parameter name 'Status') and a connection handle (parameter name 'Connection_Handle').

The above procedure enables connection authentication between the server and the camera 1 even in the case of permission of multiple connections via one PIN code, like the procedure of connection authentication at establishment of communication links (FIG. 15). Each registered PIN code is, however, not one-to-one mapped to the connection handle. This leads to failed identification of the PIN code used for authentication and failed mapping of the connected BT terminal to the PIN code, thus causing failed identification of the mapping of the PIN code to the process.

The procedure of this embodiment accordingly carries out additional steps, which are identical with the eleventh and twelfth steps (see FIG. 15) in the procedure of connection authentication performed at establishment of communication links in the case of permission of multiple connections via one registered PIN code. As shown in FIG. 19, at a ninth step (S9), the service providing device 200 sends a control command 'HCI_Check_PIN_Code' to the BT module 300 as a request for the PIN code. The control command 'HCI_Check_PIN_Code' is identical with the user-defined control command in the procedure of connection authentication at establishment of communication links. At a tenth step (S10), the BT module 300 sends an event 'HCI_Command_Complete_event' to the service providing device 200, which is thus notified of the PIN code used for connection authentication of the BT terminal having the specified BT address (camera 1).

This specifies the PIN code of the BT terminal (camera 1) as the object of connection authentication and the process mapped to the PIN code, thus identifying the user utilizing the process as the object of connection authentication.

B.4. Effects

In the procedure of the second embodiment described above, in response to the connection authentication requests from the $1^{st}$ to the $7^{th}$ digital cameras CM1' to CM7', the sever PSV' performs connection authentication of the $1^{st}$ to the $7^{th}$ digital cameras CM1' to CM7', while identifying the PIN codes input respectively into the $1^{st}$ to the $7^{th}$ digital cameras CM1' to CM7'. The PIN code allocation management unit 234 manages the mapping of the allocated PIN codes to the $1^{st}$ to the $7^{th}$ processes PS1 to PS7. The digital cameras CM1' to CM7' are thus one-to-one mapped to the $1^{st}$ to the $7^{th}$ processes PS1 to PS7 utilized by the users U1 to U7 of the respective digital cameras.

The connection authentication of this embodiment requires the user to enter only one simple PIN code into the own digital camera. The user is then allowed to make the BT wireless communication with only one specified process.

In the server PSV' of this embodiment, registration of the PIN codes allocated to the respective processes and check of each PIN code used for connection authentication are implemented between the PIN code allocation management unit 234 included in the service-side BT control unit 230 of the service providing device 200 and the PIN code management unit 314 included in the module-side BT control unit 310 of the BT module 300. The connection authentication procedure of this embodiment thus newly adds the control command 'HCI_WriteStoredPinCode' for controlling the PIN code registration and the control code 'HCI_Check_PIN_Code' for controlling the PIN code check to the general control commands of the logic IF (HCI) defined in the BT communication standard between the service providing device 200 and the BT module 300 in the server PSV'. The specification of the HCI generally allows addition of user-defined commands. Addition of these control commands is thus in conformity with the specification of the HCI.

In the connection authentication of this embodiment, the communication procedure between the server PSV' and the BT terminals ($1^{st}$ to $7^{th}$ digital cameras CM1' to CM7') is consistent with the general connection authentication procedure in the BT communication standard. The digital camera as the BT terminal to be connected to the server is thus not required to have any special mechanism for the connection authentication of this embodiment but advantageously utilizes the general BT communication functions to receive the print service provided by the print service providing system of the embodiment.

In the structure of this embodiment, the BT module 300 is linked to the service providing device 200 in the server PSV', whereas the BT module 500 is linked to the camera device 400 in each digital camera as the BT terminal connected to the server PSV' as shown in FIG. 11. This structure is only illustrative to explain addition of the new control commands to the logic IF (HCI) between the service providing device 200 and the BT module 300 in the server PSV'. The digital camera of the first embodiment (see FIG. 3) may alternatively be used as the BT terminal connected to the server PSV' of the second embodiment.

C. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

C1. MODIFIED EXAMPLE 1

Figure 20:
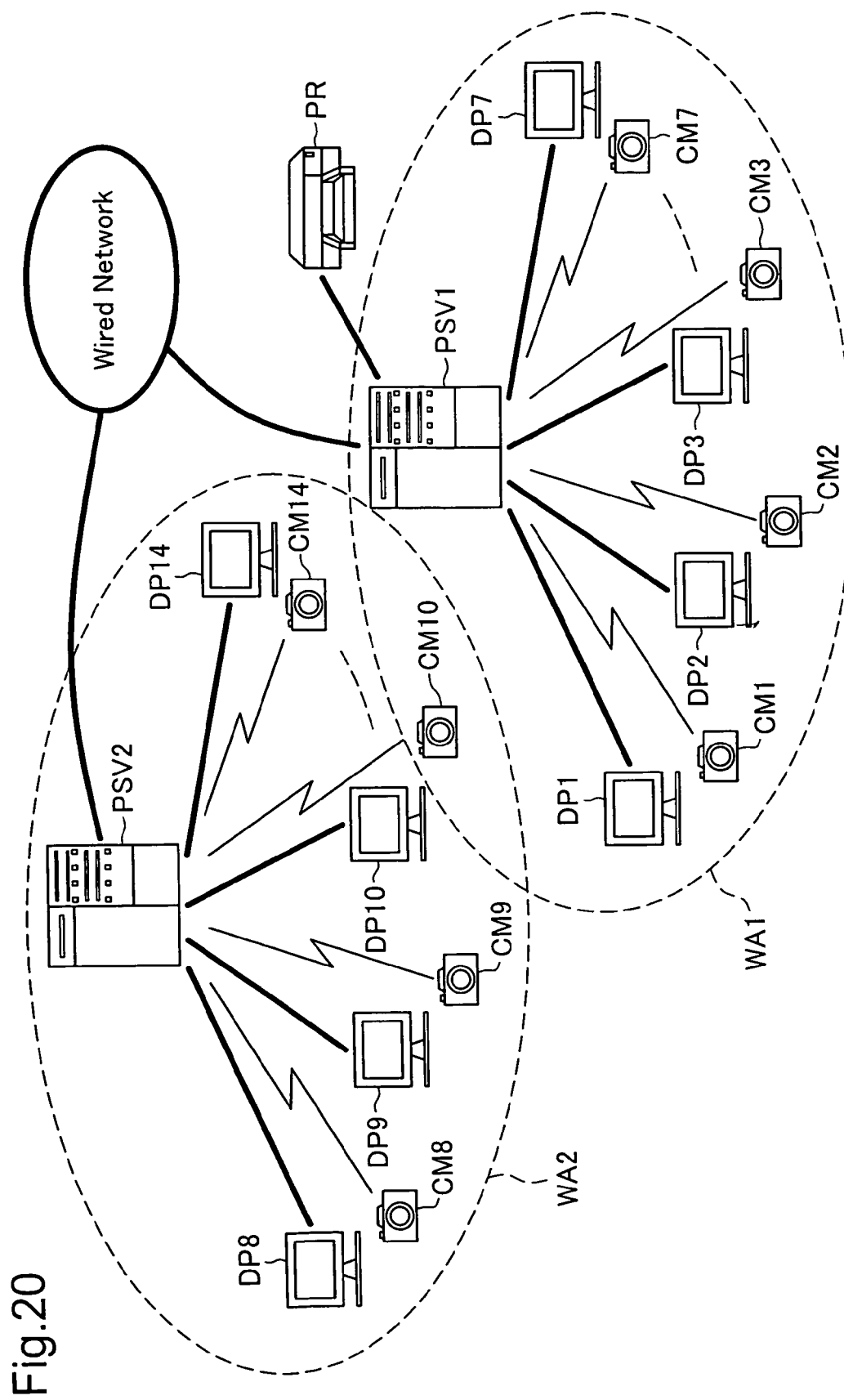
FIG. 20 schematically illustrates the configuration of a print service providing system as one modified example of the communication network system of the invention.

FIG. 20 schematically illustrates the configuration of a print service providing system as one modified example of the communication network system of the invention. The print service providing system may be constructed to include multiple servers as BT access points, which are interconnected via a wired network. The print service providing system illustrated in FIG. 20 includes two servers PSV1 and PSV2, to which the total of fourteen digital cameras CM1 to CM14 are connected. The seven digital cameras CM1 to CM7 enter a communication range WA1 of the first server PSV1, while the other seven digital cameras CM8 to CM14 enter a communication range WA2 of the second server PSV2.

Each BT access point performs the connection authentication described above to map the user's digital cameras to the processes utilized by the respective users. When the communication ranges of the two BT access points partly overlap, a digital camera in the overlapped area is connectable with either of the two BT access points. In the illustrated example of FIG. 20, the 10$^{th}$ digital camera CM10 is in the overlapped area of the two communication ranges WA1 and WA2. In this case, the access point making connection with the 10$^{th}$ digital camera CM10 is not fixed. The two servers as the access points accordingly exchange the information on the PIN codes allocated to the processes provided by the respective servers and generate possible options of link keys corresponding to all these PIN codes.

C2. MODIFIED EXAMPLE 2

In the print service providing systems of the above embodiments, the service providing module or the service providing device in the server provides seven processes PS1 to PS7. In one possible modification, seven client terminals connected to the server via a wired network may respectively provide seven processes PS1 to PS7.

C3. MODIFIED EXAMPLE 3

The embodiments and their modifications regard the print service providing systems as the communication network system of the invention. The technique of the invention is, however, not restricted to the print service providing systems but may be applied to diversity of other BT communication network systems.

C4. MODIFIED EXAMPLE 4

The above embodiments describe the BT communication network systems. The technique of the invention is, however, not restricted to the BT communication standard, but is applicable to various communication network systems utilizing diversity of other wireless communication standards.

INDUSTRIAL APPLICABILITY

The wireless communication network system of the invention is preferably adopted in service industries that provide general users with diverse services including print services in various public places, such as family restaurants.

The invention claimed is:

1. A wireless communication network system including a base station and multiple wireless communication terminals connecting with the base station via a wireless network,
   the base station comprising:
   an identification information management module that allocates multiple different pieces of identification information to be registered respectively in the multiple wireless communication terminals; and
   a link management module that manages a communication link between the base station and each of the multiple wireless communication terminals,
   wherein in response to a request for connection authentication sent from each of the multiple wireless communication terminals to the base station to establish a communication link,
   the link management module receives authentication information of each wireless communication terminal, which is generated corresponding to a piece of identification information allocated by the identification information management module and registered in the wireless communication terminal, from the wireless communication terminal via the wireless network,
   the link management module compares the authentication information received from the wireless communication terminal with multiple possible options of authentication information generated corresponding to the multiple different pieces of identification information allocated by the identification information management module, and authenticates the wireless communication terminal that has sent the authentication information matching with one of the multiple possible options of authentication information, and
   the identification information management module manages a mapping of each specific piece of identification information, which corresponds to a specific option of authentication information matching with the authentication information of the authenticated wireless communication terminal, to the authenticated wireless communication terminal, and
   wherein a wireless communication standard adopted in the wireless network is Bluetooth.

2. A wireless communication network system in accordance with claim 1, wherein the base station further comprises:
   a process providing module that respectively provides the multiple wireless communication terminals with corresponding multiple processes, and
   the identification information management module respectively notifies the multiple wireless communication terminals of the multiple different pieces of identification information via the corresponding processes and manages a mapping of the respective processes to the notified pieces of identification information, prior to the request for connection authentication sent from each of the multiple wireless communication terminals to the base station.

3. A wireless communication network system including a base station and multiple wireless communication terminals connecting with the base station via a wireless network,
   the base station comprising:
   a process providing device that includes a process provider module for providing multiple processes and a first wireless control module; and
   a wireless communication device that includes a wireless communication module and a second wireless control module, and is connected to the process providing device via a preset line and makes wireless communication with each of the multiple wireless communication terminals by the wireless communication module,
   the first wireless control module comprising:
   an identification information allocation management module that allocates multiple different pieces of first identification information to the multiple processes and manages a mapping of the multiple processes to the allocated multiple different pieces of first identification information,
   the second wireless control module comprising:
   an identification information management module that registers and stores the multiple different pieces of first identification information allocated by the identification information allocation management module; and
   a link management module that manages a communication link with each of the multiple wireless communication terminals, wherein in response to a request for connection authentication sent from each of the multiple wireless communication terminals to the base station to establish wireless communication, each of the multiple wireless communication terminals generates second authentication information corresponding to each registered piece of second identification information and sends the generated second authentication information to the base station via the wireless network, and the link management module receives the second authentication information, generates multiple possible options of first authentication information corresponding to the multiple different pieces of first identification information stored in the identification information management module, compares the received second authentication information with the generated multiple possible options of first authentication information, and authenticates the wireless communication terminal that has sent the second authentication information matching with one of the multiple possible options of first authentication information, and wherein a wireless communication standard adopted in the wireless network is Bluetooth.

4. A wireless communication network system in accordance with claim 3, wherein the identification information management module manages a mapping of each specific piece of first identification information, which corresponds to a specific option of first authentication information matching with the second authentication information of the authenticated wireless communication terminal, to the authenticated wireless communication terminal.

5. A wireless communication network system in accordance with either one of claims 3 and 4, wherein in response to a first control command defined in a logic interface mounted on the preset line, the first wireless control module notifies the second wireless control module via the logic interface of the multiple different pieces of first identification information to be registered in the identification information management module, wherein a wireless communication standard adopted in the wireless network is Bluetooth, and the logic interface is a host control interface.

6. A wireless communication network system in accordance with claim 5, wherein on registration of the multiple different pieces of first identification information in the identification information management module, the second wireless control module notifies the first wireless control module via the logic interface of multiple different pieces of specific information, which respectively correspond to the registered multiple different pieces of first identification information, the identification information allocation management module manages a mapping of the multiple different pieces of first identification information to the corresponding multiple different pieces of specific information, on authentication of each wireless communication terminal by the link management module, the second wireless control module notifies the first wireless control module via the logic interface of a particular piece of specific information, which is mapped to a particular piece of first identification information corresponding to a particular possible option of first authentication information matching with the second authentication information, and the identification information allocation management module identifies a process corresponding to the particular piece of first identification information mapped to the notified particular piece of specific information.

7. A wireless communication network system in accordance with claim 5, wherein in response to a second control command defined in the logic interface, the second wireless control module notifies the first wireless control module via the logic interface of a particular piece of first identification information, which corresponds to a particular possible option of first authentication information matching with the second authentication information, and the identification information allocation management module identifies a process corresponding to the notified particular piece of first identification information.

8. A base station that is connectable with multiple wireless communication terminals via a communication network, the base station comprising:

an identification information management module that allocates multiple different pieces of identification information to be registered respectively in the multiple wireless communication terminals; and a link management module that manages a communication link between the base station and each of the multiple wireless communication terminals, wherein in response to a request for connection authentication sent from each of the multiple wireless communication terminals to the base station to establish a communication link, the link management module receives authentication information of each wireless communication terminal, which is generated corresponding to a piece of identification information allocated by the identification information management module and registered in the wireless communication terminal, from the wireless communication terminal via the wireless network, the link management module compares the authentication information received from the wireless communication terminal with multiple possible options of authentication information generated corresponding to the multiple different pieces of identification information allocated by the identification information management module, and authenticates the wireless communication terminal that has sent the authentication information matching with one of the multiple possible options of authentication information, and the identification information management module manages a mapping of each specific piece of identification information, which corresponds to a specific option of authentication information matching with the authentication information of the authenticated wireless communication terminal, to the authenticated wireless communication terminal, and wherein a wireless communication standard adopted in the wireless network is Bluetooth.

9. A base station in accordance with claim 8, the base station further comprising:

a process providing module that respectively provides the multiple wireless communication terminals with corresponding multiple processes, wherein the identification information management module respectively notifies the multiple wireless communication terminals of the multiple different pieces of identification information via the corresponding processes and manages a mapping of the respective processes to the notified pieces of identification information, prior to the request for connection authentication sent from each of the multiple wireless communication terminals to the base station.

10. A base station that is connectable with multiple wireless communication terminals via a communication network, the base station comprising:
- a process providing device that includes a process provider module for providing multiple processes and a first wireless control module; and
- a wireless communication device that includes a wireless communication module and a second wireless control module, and is connected to the process providing device via a preset line and makes wireless communication with each of the multiple wireless communication terminals by the wireless communication module,
- the first wireless control module comprising:
- an identification information allocation management module that allocates multiple different pieces of first identification information to the multiple processes and manages a mapping of the multiple processes to the allocated multiple different pieces of first identification information,
- the second wireless control module comprising:
- an identification information management module that registers and stores the multiple different pieces of first identification information allocated by the identification information allocation management module; and
- a link management module that manages a communication link with each of the multiple wireless communication terminals,
- wherein in response to a request for connection authentication sent from each of the multiple wireless communication terminals to the base station to establish wireless communication,
- each of the multiple wireless communication terminals generates second authentication information corresponding to each registered piece of second identification information and sends the generated second authentication information to the base station via the wireless network, and
- the link management module receives the second authentication information, generates multiple possible options of first authentication information corresponding to the multiple different pieces of first identification information stored in the identification information management module, compares the received second authentication information with the generated multiple possible options of first authentication information, and authenticates the wireless communication terminal that has sent the second authentication information matching with one of the multiple possible options of first authentication information, and
- wherein a wireless communication standard adopted in the wireless network is Bluetooth.

11. A base station in accordance with claim 10, wherein the identification information management module manages a mapping of each specific piece of first identification information, which corresponds to a specific option of first authentication information matching with the second authentication information of the authenticated wireless communication terminal, to the authenticated wireless communication terminal.

12. A base station in accordance with either one of claims 10 and 11, wherein in response to a first control command defined in a logic interface mounted on the preset line, the first wireless control module notifies the second wireless control module via the logic interface of the multiple different pieces of first identification information to be registered in the identification information management module,
- wherein a wireless communication standard adopted in the wireless network is Bluetooth, and
- the logic interface is a host control interface.

13. A base station in accordance with claim 12, wherein on registration of the multiple different pieces of first identification information in the identification information management module, the second wireless control module notifies the first wireless control module via the logic interface of multiple different pieces of specific information, which respectively correspond to the registered multiple different pieces of first identification information,
- the identification information allocation management module manages a mapping of the multiple different pieces of first identification information to the corresponding multiple different pieces of specific information,
- on authentication of each wireless communication terminal by the link management module, the second wireless control module notifies the first wireless control module via the logic interface of a particular piece of specific information, which is mapped to a particular piece of first identification information corresponding to a particular possible option of first authentication information matching with the second authentication information, and
- the identification information allocation management module identifies a process corresponding to the particular piece of first identification information mapped to the notified particular piece of specific information.

14. A base station in accordance with claim 12, wherein in response to a second control command defined in the logic interface, the second wireless control module notifies the first wireless control module via the logic interface of a particular piece of first identification information, which corresponds to a particular possible option of first authentication information matching with the second authentication information, and
- the identification information allocation management module identifies a process corresponding to the notified particular piece of first identification information.

15. An authentication method for establishing a communication link between a base station and each of multiple wireless communication terminals, which are connected to the base station via a wireless network, the authentication method comprising the steps of:
- allocating in advance multiple different pieces of identification information to be registered respectively in the multiple wireless communication terminals; and
- receiving authentication information of each wireless communication terminal, which is generated corresponding to a piece of identification information registered in the wireless communication terminal, from the wireless communication terminal via the wireless network;
- comparing the authentication information received from the wireless communication terminal with multiple possible options of authentication information generated corresponding to the multiple different pieces of identification information, and authenticating the wireless communication terminal that has sent the authentication information matching with one of the multiple possible options of authentication information; and
- managing a mapping of each specific piece of identification information, which corresponds to a specific option of authentication information matching with the authentication information of the authenticated wireless communication terminal, to the authenticated wireless communication terminal,
- wherein a wireless communication standard adopted in the wireless network is Bluetooth.

16. A computer program product that causes a computer installed in a base station to establish a communication link with each of multiple wireless communication terminals via a wireless network, the computer program product comprising:

a computer readable medium; and a computer program that is stored on the computer readable medium, the computer program comprising:

a first program of allocating in advance multiple different pieces of identification information to be registered respectively in the multiple wireless communication terminals; and a second program of receiving authentication information of each wireless communication terminal, which is generated corresponding to a piece of identification information registered in the wireless communication terminal, from the wireless communication terminal via the wireless network, comparing the authentication information received from the wireless communication terminal with multiple possible options of authentication information generated corresponding to the multiple different pieces of identification information, authenticating the wireless communication terminal that has sent the authentication information matching with one of the multiple possible options of authentication information, and managing a mapping of each specific piece of identification information, which corresponds to a specific option of authentication information matching with the authentication information of the authenticated wireless communication terminal, to the authenticated wireless communication terminal, wherein a wireless communication standard adopted in the wireless network is Bluetooth.

* * * * *